US012163614B2

(12) United States Patent
Alioli et al.

(10) Patent No.: US 12,163,614 B2
(45) Date of Patent: Dec. 10, 2024

(54) FLOW DIVIDER AND FLUID LINE SYSTEM FORMED BY SAME

(71) Applicant: Endress+Hauser Flowtec AG, Reinach (CH)

(72) Inventors: Mattia Alioli, Binningen (CH); Vivek Kumar, Allschwil (CH); Marc Werner, Grenzach-Wyhlen (DE); Natalie Schlachter, Wehr (DE)

(73) Assignee: Endress+Hauser Flowtec AG, Reinach (CH)

( * ) Notice: Subject to any disclaimer, the term of this patent is extended or adjusted under 35 U.S.C. 154(b) by 19 days.

(21) Appl. No.: 18/036,846

(22) PCT Filed: Nov. 12, 2020

(86) PCT No.: PCT/EP2020/081924
§ 371 (c)(1),
(2) Date: May 12, 2023

(87) PCT Pub. No.: WO2022/100836
PCT Pub. Date: May 19, 2022

(65) Prior Publication Data
US 2023/0408013 A1     Dec. 21, 2023

(51) Int. Cl.
*F16L 41/02*     (2006.01)
(52) U.S. Cl.
CPC ................... *F16L 41/023* (2013.01)
(58) Field of Classification Search
CPC .................................................. F16L 41/023
See application file for complete search history.

(56) References Cited

U.S. PATENT DOCUMENTS 9,506,793 B2 * 11/2016 Sukemura ............. G01F 1/8477
9,909,718 B2 *  3/2018 Wittbold ............... B28C 5/0881
(Continued)

FOREIGN PATENT DOCUMENTS

DE       102014118367 A1    6/2016
DE       102017131187 A1    6/2019
(Continued)

*Primary Examiner* — Eric Keasel
(74) *Attorney, Agent, or Firm* — Kelly J. Smith; Endress+Hauser (USA) Holding, Inc.

(57) ABSTRACT

A flow divider comprises a lumen having perpendicular, symmetry planes intersecting in an axis of inertia connecting the ends. Cross sectional area have radii extending from a geometric center of gravity to the wall and lying at an angle $\varphi$ ($-180° \leq \varphi \leq 180°$) to a reference axis and being perpendicular to its axis of inertia, wherein each radius lying at an angle $\varphi=0°$ to the relevant reference axis points away from the symmetry plane, and fulfills a formula $f_i(\varphi, P_i)$ associated with its cross sectional area and defined by a coefficients set $P_i$ ($P_i=[a_i\ b_i\ m_{1i}\ m_{2i}\ n_{1i}\ n_{2i}\ n_{3i}]$) corresponding to the flow divider opening:

$$R_i(\varphi) = R_0 \cdot r_i(\varphi) = f_i(\varphi, P_i) = f_i(\varphi, [a_i\ b_i\ m_{1i}\ m_{2i}\ n_{1i}\ n_{2i}\ n_{3i}])$$

$$= R_0 \cdot {}^{-n_{1i}}\!\!\sqrt{\left|\frac{1}{a_i}\cos\!\left(\frac{m_{1i}}{4}\varphi\right)\right|^{n_{2i}} + \left|\frac{1}{b_i}\sin\!\left(\frac{m_{2i}}{4}\varphi\right)\right|^{n_{3i}}},$$

in such a manner that the radii $R_4(\varphi)$ of a cross sectional area of the lumen fulfills a formula $f_4(\varphi, P_4)$ defined by a coefficients set $P_4=[a_4\ b_4\ m_{14}\ m_{24}\ n_{14}\ n_{24}\ n_{34}]$, with $a_4=$ (0.95 ... 1), $b_4=$(0.45 ... 0.7), $m_{14}=4$, $m_{24}=4$, $n_{14}=3.0$, $n_{24}=n_{14}$ and $n_{34}=$(3 ... 4).

20 Claims, 10 Drawing Sheets

(56) References Cited

U.S. PATENT DOCUMENTS

| | | | |
|---|---|---|---|
| 10,240,958 B2* | 3/2019 | Blackmore | G01F 1/8413 |
| 10,663,335 B2* | 5/2020 | Casey | G01F 15/18 |
| 2013/0100759 A1 | 4/2013 | Wittbold et al. | |

FOREIGN PATENT DOCUMENTS

| | | |
|---|---|---|
| EP | 2771157 B2 | 9/2014 |
| EP | 2843375 A1 | 3/2015 |
| EP | 3301411 A1 | 4/2018 |
| EP | 2843375 B1 | 9/2018 |
| WO | 2017105493 A1 | 6/2017 |
| WO | 2017198440 A1 | 11/2017 |
| WO | 2020023056 A1 | 1/2020 |

\* cited by examiner

FLOW DIVIDER AND FLUID LINE SYSTEM FORMED BY SAME

CROSS-REFERENCE TO RELATED APPLICATIONS

The present application is related to and claims the priority benefit of International Patent Application No. PCT/EP2020/081924, filed Nov. 12, 2020, the entire contents of which are incorporated herein by reference.

TECHNICAL FIELD

The invention relates to a flow divider for connecting fluid lines serving for conveying a flowing fluid. Moreover, the invention relates to a fluid line system formed by such a flow divider.

BACKGROUND

Known from U.S. Pat. No. 4,801,897, US-A 2008/0184816, US-A 2011/0154912, US-A 2017/0219398, US-A 2018/0313487, WO-A 2006/107297, WO-A 2006/118557, WO-A 2009/078880, WO-A 2009/123632, WO-A 2015/162617, WO-A 2015/085025, WO-A 2017/048235, WO-A 2017/105493 or WO-A 2017/198440 are flow dividers (at times, also given other names, such as distributors or manifolds) serving for connecting tubes conveying a flowing fluid, as well as their application as line branchings or line junctions of a fluid line system.

Such flow dividers all comprise, surrounded by a wall, a lumen, which extends both from a first flow divider opening located in a first flow divider end and from a second flow divider opening located laterally spaced from the first flow divider opening in the first flow divider end to a circularly shaped, third flow divider opening located in a second flow divider end, especially a second flow divider end held in a connecting flange, in such a manner that the lumen has a principal axis of inertia imaginarily connecting the two flow divider ends as well as a first symmetry plane and a second symmetry plane perpendicular thereto. The two symmetry planes imaginarily intersect one another in the principal axis of inertia and the lumen has planar cross sectional areas lying perpendicular to the principal axis of inertia and having, in each case, a geometric center of gravity located in the first symmetry plane. The walls of the flow divider can be made, for example, of a metal, such as e.g. a stainless steel. Of the cross sectional areas, a first cross sectional area located in the first flow divider end and having its geometric center of gravity removed from the principal axis of inertia of the lumen corresponds to the first flow divider opening of the flow divider, a second cross sectional area likewise located in the first flow divider end and having its geometric center of gravity removed both from the principal axis of inertia of the lumen as well as also from the geometric center of gravity of the above described, first cross sectional area corresponds to the second flow divider opening of the flow divider and a third cross sectional area located in the second flow divider end and having its geometric center of gravity lying on the principal axis of inertia of the lumen corresponds to the third flow divider opening of the flow divider. Typically, the third cross sectional area of such a flow divider, particularly for the purpose of an easy connecting to a pipeline supplying or draining the medium, is, in each case, circularly embodied, while the first and second cross sectional areas can be embodied both circularly as well as also, such as, for example, shown in WO-A 2017/048235 and WO-A 2017/198440, oval shaped or, such as, for example, shown in WO-A 2017/105493, semicircularly shaped. Additionally, each of the cross sectional areas has, as a matter of course, a separation from the first cross sectional area, measured as a separation between a projection of the geometric center of gravity of the cross sectional area onto the above-mentioned principal axis of inertia and the geometric center of gravity of the first cross sectional area, wherein the separation between the first and second cross sectional areas and the third cross sectional area corresponds, in each case, to a (total-)length of the lumen.

As shown, furthermore, in US-A 2008/0184816, US-A 2011/0154912, US-A 2017/0219398, US-A 2018/0313487, WO-A 2006/107297, WO-A 2006/118557, WO-A 2009/078880, WO-A 2009/123632, WO-A 2015/162617, WO-A 2017/048235, WO-A 2017/105493, WO-A 2017/198440 or WO-A 2008/024112, in each case, each of the flow dividers can, additionally, be, for example, an integral component of a fluid line system, especially a fluid line system serving for measuring at least one physical, measured variable of a fluid flowing in a pipeline, for example, applied as a line junction of a Coriolis-mass flow-measuring device having two measuring tubes vibrating during operation. Each of the above referenced fluid line systems includes, accordingly, besides the flow dividers, in each case, at least two fluid lines, of which, in each case, a first fluid line is connected with an end section by material bonding with the first flow divider opening and a second fluid line is connected with an end section by material bonding with the second flow divider opening, in such a manner that a lumen of the first fluid line communicates with the lumen of the flow divider to form a first flow path and a lumen of the second fluid line communicates with the lumen of the flow divider to form a second flow path parallel to the first flow path. The walls of the fluid lines can, for example, likewise be made of a metal, such as e.g. a stainless steel. The fluid line system can be so applied that its flow divider serves as a line junction, for instance, in order, as well as also disclosed in US-A 2017/0219398, US-A 2018/0313487 or WO-A 2008/024112, by means of the flow divider, to bring (back) together, or to mix with one another, separate fluid streams, namely fluid streams conveyed by the first fluid line and the second fluid line to the flow divider, in given cases, also fluid streams independent of one another and/or having compositions differing from one another.

Moreover, a fluid line system of the aforementioned type, particularly in the case of application in a Coriolis-mass flow-measuring device, can, furthermore, also have, in such case, in addition to the above described (first) flow divider a (second) flow divider, for example, an equally-constructed flow divider serving as a line branching. The second flow divider is, analogously to the first flow divider, in each case, connected with its first line end both with a second line end of the first fluid line removed from the first line end connected with the first flow divider as well as also with a second line end of the second fluid line removed from the first line end of the first line end likewise connected with the first flow divider, in such a manner that both the lumen of the first fluid line as well as also the lumen of the second fluid line communicate both with the lumen of the first flow divider as well as also with the lumen of the second flow divider, and that the second flow divider opening of the second fluid line communicates with the first flow divider opening of the second flow divider and the second flow divider opening of the second fluid line communicates with the second flow divider opening of the second flow divider, such that, as a result, the fluid line system provides two flow paths connected for parallel flow, namely flow paths leading through the first fluid line and the second fluid line.

The fluid line systems can each, such as already mentioned, additionally, be embodied as an integral component of a measuring transducer, for example, a vibronic measuring transducer, which serves, or is adapted, to generate at least one measurement signal having at least one signal parameter corresponding with a measured variable, for example, a mass flow (mass flow rate), a density or a viscosity, of the through flowing fluid, namely at least one signal parameter dependent on the measured variable, for example, a signal parameter in the form of a signal level dependent on the measured variable and/or a signal frequency dependent on the measured variable and/or a phase angle dependent on the measured variable. The measuring transducer can, in turn, be connected with a corresponding measuring- and operating electronics to form a (vibronic) measuring system, for example, a Coriolis-mass flow-measuring device, a vibronic density-measuring device and/or a vibronic viscosity-measuring device.

For the mentioned case, in which the measuring transducer is a vibronic measuring transducer, the first and second fluid lines are, especially, in each case, also adapted to be flowed through by the fluid to be measured and during that to be caused to vibrate for the purpose of generating the at least one measurement signal, wherein serving as a measurement signal is typically at least one oscillation measurement signal representing oscillatory movements of the first and/or second fluid lines and having at least one signal frequency dependent on density of the fluid conveyed in the fluid lines and/or a phase angle dependent on mass flow rate. For exciting and maintaining mechanical oscillations of the fluid lines, for example, opposite equal, bending oscillations of the first and second fluid lines, each of the above described fluid line systems, or the measuring transducer formed therewith, comprises, furthermore, in each case, at least one electromechanical, for example, electrodynamic, oscillation exciter. Moreover, such a fluid line system includes at least one oscillation sensor, for example, applied on at least the first fluid line and/or at least placed in its vicinity, for producing the at least one measurement signal corresponding to the measured variable. Particularly for the above described case, in which the measuring transducer, namely the measuring system formed therewith, is provided to measure mass flow of the through flowing fluid, such a fluid line system can also comprise at least two oscillation sensors applied to the first and/or second fluid line and/or at least placed in their vicinity and removed from one another, in given cases, also equally constructed oscillation sensors, which are adapted, in each case, to produce a measurement signal corresponding to the measured variable, especially in such a manner that a phase difference dependent on mass flow rate is established between the two measurement signals. For the purpose of ascertaining the measured variable, the two fluid lines of such vibronic measuring transducers are typically actively excited to execute opposite equal, bending oscillations in a driven—or wanted, mode, namely actively excited to execute oscillations at at least one oscillation frequency serving as wanted frequency for the measuring, for example, at one or more instantaneous resonance frequencies of natural oscillation modes of the fluid line system and/or—, such as also disclosed in the above cited U.S. Pat. No. 4,801,897, by means of an electronic driver circuit provided in the measuring device-electronics electrically coupled to the at least one oscillation exciter as well as also with the at least one oscillation sensor and formed, in given cases, as a phase locked control loop (PLL—phase locked loop).

The above discussed fluid line systems serving as measuring transducers are additionally, especially, provided, and adapted, to be introduced into the course of a pipeline, in such a manner that a fluid stream conveyed to the measuring transducer is divided by means of one of the two flow dividers, thus, into two separate fluid streams within the measuring transducer, and the fluid streams are led together by means of the other flow divider, thus, likewise within the measuring transducer, back to a single fluid stream, such that the measuring transducer acts outwardly virtually as a single tube, and can, additionally, be connected by means of standard flange connections very easily, and without additional technical effort, to the corresponding segments of the pipeline. Such fluid line systems, and formed therewith, vibronic measuring transducers serving, for example, for generating Coriolis forces dependent on mass flow of the flowing fluid, are manufactured by the applicant, and, in combination with suitably tailored measuring electronics, are available as Coriolis-mass flow-measuring devices, or as Coriolis-mass flow-/density-measuring devices, for example, under the designations "PROMASS F 200", "PROMASS G 100", "PROMASS O 100", "PROMASS 83E", "PROMASS 84F", "CNGmass", "LPGmass" or "Dosimass".

It is known that a pressure loss (pressure drop) caused in fluid line systems of the aforementioned type in the through flowing fluid is determined in considerable measure also by the one or more flow dividers installed therein, especially the geometric shape of their lumens; this, especially, also in such a manner that a dependence of the pressure loss on the Reynolds number of the fluid is non-linear and, additionally, also can be affected significantly by disturbing influences occurring in given cases, such as, for instance, turbulence or temperature fluctuations in the fluid, or varying particle entrainment and/or bubble formation. In the case of application of such a fluid line system in a measuring system, in turn, its accuracy of measurement can be co-determined by the above described pressure loss, consequently a corresponding measurement error can be non-linearly dependent on the Reynolds number of the fluid to be measured, and, in spite of nominally steady-state flow, can have a considerable, equally as well, not desired, variance.

SUMMARY

Taking this into consideration, an object of the invention is to provide an improved flow divider of the above described type, which brings about in a through flowing fluid, compared with conventional flow dividers, in the case of equal Reynolds number a lower specific pressure loss, namely a pressure loss standardized to an installed length, and/or in the case of which the pressure loss is stabler compared with conventional flow dividers, namely, while keeping constant Reynolds number, varies less, and/or to provide a correspondingly improved fluid line system; this, especially, also in order further to increase an accuracy of measurement, or reproducibility, of measured values generated by means of measuring systems formed of such a fluid line system.

For achieving the object, the invention resides in a flow divider (for example, a flow divider also serving as a line branching or as a line junction) for connecting of fluid lines serving for conveying a flowing fluid, which flow divider comprises, surrounded by a wall, for example, of a metal, a lumen, extending both from a first flow divider opening, for example, a circularly shaped, first flow divider opening, located in a first flow divider end and from a second flow divider opening, for example, circularly shaped, second flow divider opening, located spaced in the first flow divider end from the first flow divider opening to a third flow divider opening, for example, a circularly shaped, third flow divider opening, located in a second flow divider end, for example, a second flow divider end held in a connecting flange. The lumen of the flow divider of the invention has a principal axis of inertia imaginarily connecting the first and second flow divider ends as well as a first symmetry plane and a second symmetry plane perpendicular thereto, and the first and second symmetry planes imaginarily intersect one another in the principal axis of inertia. Additionally, the lumen of the flow divider of the invention has planar cross sectional areas, which are perpendicular to the principal axis of inertia and which have, in each case, a geometric center of gravity located in the first symmetry plane. Of the cross sectional areas, a first cross sectional area located in the first flow divider end and having its geometric center of gravity removed from the principal axis of inertia of the lumen corresponds to the first flow divider opening of the flow divider, a second cross sectional area likewise located in the first flow divider end and having its geometric center of gravity removed both from the principal axis of inertia of the lumen as well as also from the geometric center of gravity of the first cross sectional area corresponds to the second flow divider opening of the flow divider and a third cross sectional area located in the second flow divider end and having its geometric center of gravity lying on the principal axis of inertia of the lumen corresponds to the third flow divider opening of the flow divider. Each of the cross sectional areas of the lumen has, in turn, a separation $z_i$ from the third cross sectional area, measured as a separation between a projection of the geometric center of gravity of such cross sectional area onto the principal axis of inertia and the geometric center of gravity of the third cross sectional area, as well as, in each case, radii extending from a geometric center of gravity to the wall and, in each case, lying at an angle $\varphi$ ($-180°\leq\varphi\leq180°$) to a reference axis, namely an imaginary axis lying both in the cross sectional area as well as also in the first symmetry plane of the lumen and, additionally, being perpendicular on its principal axis of inertia. Each radius $R_i(0°)$ of each cross sectional area lying at an angle $\varphi=0°$ to the relevant reference axis and pointing away from the second symmetry plane fulfills, in each case, a formula $f_i(\varphi, P_i)$ defined by a coefficients set $P_i$ ($P_i=[a_i\ b_i\ m_{1i}\ m_{2i}\ n_{1i}\ n_{2i}\ n_{3i}]$) for the particular cross sectional area and containing seven coefficients, namely, in each case, first and second coefficients of expansion $a_i$, $b_i$, first and second symmetry coefficients $m_{1i}$, $m_{2i}$ as well as first, second and third form coefficients $n_{1i}$, $n_{2i}$ and $n_{3i}$ and, in each case, scaled to a greatest radius $R_0$ of the third cross sectional area, namely:

$$R_i(\varphi) = R_0 \cdot r_i(\varphi) = f_i(\varphi, P_i) = f_i(\varphi, [a_i\ b_i\ m_{1i}\ m_{2i}\ n_{1i}\ n_{2i}\ n_{3i}])$$

$$= R_0 \cdot {}^{-n_{1i}}\!\!\sqrt{\left|\frac{1}{a_i}\cos\left(\frac{m_{1i}}{4}\varphi\right)\right|^{n_{2i}} + \left|\frac{1}{b_i}\sin\left(\frac{m_{2i}}{4}\varphi\right)\right|^{n_{3i}}};$$

this, especially, in such a manner that the radii $R_1(\varphi)$ of the first cross sectional area of the lumen fulfill a first formula $f_1(\varphi, P_1)$ defined by a first coefficients set $P_1=[a_1\ b_1\ m_{11}\ m_{21}\ n_{11}\ n_{21}\ n_{31}]$ with $a_1=(0.4\ldots 0.5)$, $b_1=(0.4\ldots 0.5)$, for example, $b_1=a_1$, $m_{11}=4$, $m_{21}=4$, $n_{11}=(2\ldots 3)$, for example, $n_{11}=2.8$, $n_{21}=(2\ldots 3)$, for example, $n_{21}=2.2$ and $n_{31}=(2\ldots 3)$, for example, $n_{31}=2.2$, that the radii $R_2(\varphi)$ of the second cross sectional area of the lumen fulfill a second formula $f_2(\varphi, P_2)$ defined by a second coefficients set $P_2=[a_2\ b_2\ m_{12}\ m_{22}\ n_{12}\ n_{22}\ n_{32}]$ with $a_2=a_1$, $b_2=b_1$, $m_{12}=m_{11}$, $m_{22}=m_{21}$, $n_{12}=n_{11}$, $n_{22}=n_{21}$ and $n_{32}=n_{31}$, that the radii $R_3(\varphi)$ of the third cross sectional area of the lumen fulfill a third formula $f_3(\varphi, P_3)$ defined by a third coefficients set $P_3=[a_3\ b_3\ m_{13}\ m_{23}\ n_{13}\ n_{23}\ n_{33}]$ with $a_3=1$, $b_3=a_3$, $m_{13}=4$, $m_{23}=m_{13}$, $n_{13}=2.0$, $n_{23}=n_{13}$ and $n_{33}=n_{13}$, and the radii $R_4(\varphi)$ of a fourth cross sectional area of the lumen lying with its geometric center of gravity on the principal axis of inertia of the lumen and located at a separation $z_4$ from the third cross sectional area, which amounts to greater than 20% of the separation $z_1$ ($z_4>0.2\cdot z_1$) and less than 45% of the separation $z_1$ ($z_4<0.45\cdot z_1$), fulfill a fourth formula $f_4(\varphi, P_4)$ defined by a fourth coefficients set $P_4=[a_4\ b_4\ m_{14}\ m_{24}\ n_{14}\ n_{24}\ n_{34}]$ with $a_4=(0.95\ldots 1)$, $b_4=(0.45\ldots 0.7)$, $m_{14}=4$, $m_{24}=4$, $n_{14}=3.0$, $n_{24}=n_{14}$ and $n_{34}=(3\ldots 4)$.

Moreover, the invention resides in a fluid line system formed by means of such a flow divider, which, besides the flow divider of the invention, comprises a first fluid line, for example, a first fluid line embodied as a rigid and/or at least sectionally circularly cylindrical tube, wherein the first fluid line has a lumen surrounded by a wall, for example, a wall of a metal, wherein the lumen extends from a first line end of the first fluid line to a second line end of the first fluid line, as well as at least a second fluid line, for example, a second fluid line embodied as a rigid and/or at least sectionally circularly cylindrical tube and/or constructed equally to the first fluid line, wherein the second fluid line has a lumen surrounded by a wall, for example, a wall of a metal, wherein the lumen extends from a first line end of the second fluid line to a second line end of the second fluid line, in such a manner that both the first fluid line with its first line end as well as also the second fluid line with its first line end are, in each case, connected with the first flow divider end of the first flow divider, in such a manner that the lumen of the first fluid line communicates with the lumen of the first flow divider to form a first flow path leading through the first flow divider opening of the first flow divider and the lumen of the second fluid line communicates with the lumen of the first flow divider to form a second flow path leading through the second flow divider opening of the first flow divider.

In a first embodiment of the invention, it is, additionally, provided that the radii $R_5(\varphi)$ of a fifth cross sectional area of the lumen lying with its geometric center of gravity on the principal axis of inertia of the lumen and located at a separation $z_5$ from the third cross sectional area, which amounts to not less than 10% of the separation $z_1$ ($z_5\geq0.1\cdot z_1$) and no greater than 20% of the separation $z_1$ ($z_5\leq0.2\cdot z_1$), fulfill a fifth formula $f_5(\varphi, P_5)$ defined by a fifth coefficients set $P_5=[a_5\ b_5\ m_{15}\ m_{25}\ n_{15}\ n_{25}\ n_{35}]$ with $a_5=(0.97\ldots 1)$, $b_5=(0.65\ldots 1)$, $m_{15}=4$, $m_{25}=4$, $n_{15}=3$, $n_{25}=3$ and $n_{35}=(2\ldots 3.5)$. Developing this embodiment of the invention further, the fifth cross sectional area is, additionally, so embodied that its expansion coefficient $b_5$ fulfills, as a function of its separation $z_5$, scaled to the separation $z_1$ of the first cross sectional area ($xy_1$), a formula:

$$b_5 = (47.2\ldots 47.8)\cdot\left(\frac{z_5}{z_1}\right)^2 - (17.5\ldots 17.18)\cdot\left(\frac{z_5}{z_1}\right) + (2.2\ldots 2.4),$$

for example, $$b_5 = 47.51 \cdot \left(\frac{z_5}{z_1}\right)^2 - 17.88 \cdot \left(\frac{z_5}{z_1}\right) + 2.31,$$

and/or that the form coefficient $n_{35}$ fulfills, as a function of its separation $z_5$, scaled to the separation $z_1$ of the first cross sectional area $(xy_1)$, a formula:

$$n_{35} = (2.4 \ldots 2.6) \cdot \left(\frac{z_5}{z_1}\right) + (7.7 \ldots 8),$$

for example, $$n_{35} = 2.55 \cdot \left(\frac{z_5}{z_1}\right) + 7.87,$$

and/or that a ratio $n_{35}/b_5$ of its third form coefficient $n_{35}$ to its second coefficient of expansion $b_5$ amounts to greater than 2 and/or less than 6.

In a second embodiment of the invention, it is, additionally, provided that for none of the cross sectional areas of the lumen is the third form coefficient $n_{3i}$ greater than the third form coefficient $n_{34}$ of the fourth cross sectional area.

In a third embodiment of the invention, it is, additionally, provided that the fourth cross sectional area is so embodied that a ratio $n_{34}/b_4$ of its third form coefficient $n_{34}$ to its second coefficient of expansion $b_4$ amounts to not less than 5.5 and/or no greater than 7.

In a fourth embodiment of the invention, it is, additionally, provided that the radii $R_6(\varphi)$ of a sixth cross sectional area of the lumen lying with its geometric center of gravity on the principal axis of inertia of the lumen and located at a separation $z_6$ from the third cross sectional area, which amounts to greater than 45% of the separation $z_1$ ($z_6 > 0.45 \cdot z_1$) and less than 60% of the separation $z_1$ ($z_6 < 0.6 \cdot z_1$) fulfill a sixth formula $f_6(\varphi, P_6)$ defined by a sixth coefficients set $P_6 = [a_6 \ b_6 \ m_{16} \ m_{26} \ n_{16} \ n_{26} \ n_{36}]$ with $a_6 = (0.98 \ldots 1)$, $b_6 = (0.7 \ldots 0.8)$, $m_{16} = 4$, $m_{26} = 4$, $n_{16} = 1$, $n_{26} = (2 \ldots 2.5)$ and $n_{36} = (2.1 \ldots 2.8)$. Developing this embodiment of the invention further, the sixth cross sectional area is, furthermore, so embodied that its third form coefficient $n_{36}$, as a function of the separation $z_6$, scaled to the separation $z_1$, fulfills a formula:

$$n_{36} = (3.4 \ldots 3.6) \cdot \left(\frac{z_6}{z_1}\right) + (0.5 \ldots 0.7),$$

for example, $$n_{36} = 3.57 \cdot \left(\frac{z_6}{z_1}\right) + 0.64.$$

In a fifth embodiment of the invention, it is, additionally, provided that the radii $R_7(\varphi)$ of a seventh cross sectional area of the lumen lying with its geometric center of gravity removed from the principal axis of inertia (z) of the lumen and located at a separation $z_7$ from the third cross sectional area, which amounts to greater than 70% of the separation $z_1$ ($z_7 > 0.7 \cdot z_1$) and less than 95% of the separation $z_1$ ($z_7 < 0.95 \cdot z_1$), fulfill a seventh formula $f_7(\varphi, P_7)$ defined by a seventh coefficients set $P_7 = [a_7 \ b_7 \ m_{17} \ m_{27} \ n_{17} \ n_{27} \ n_{37}]$ with $a_7 = (0.40 \ldots 0.55)$, $b_7 = a_7$, $m_{17} = 3$, $m_{27} = 3$, $n_{17} = (2.7 \ldots 2.8)$ $n_{27} = (2.3 \ldots 2.5)$ and $n_{37} = n_{27}$ and the radii $R_8(\varphi)$ of an eighth cross sectional area of the lumen lying with its geometric center of gravity removed from the principal axis of inertia of the lumen and located at a separation $z_8$ from the third cross sectional area, which equals the separation $z_7$ of the seventh cross sectional area fulfill an eighth formula $f_8(\varphi, P_8)$ defined by an eighth coefficients set $P_8 = [a_8 \ b_8 \ m_{18} \ m_{28} \ n_{18} \ n_{28} \ n_{38}]$ with $a_8 = a_7$, $b_8 = b_7$, $m_{18} = m_{17}$, $m_{28} = m_{27}$, $n_{18} = n_{17}$, $n_{28} = n_{27}$ and $n_{38} = n_{37}$. Developing this embodiment of the invention further, it is, additionally, provided that the geometric center of gravity of the seventh cross sectional area of the lumen has a separation $x_7$ from the second symmetry plane and the geometric center of gravity of the eighth cross sectional area of the lumen has a separation $x_8$ from the second symmetry plane and a magnitude of each of the separations $x_7$, $x_8$ of the seventh and eighth cross sectional areas scaled to the radius $R_7(0°)$, respectively $R_8(0°)$ of the seventh, and eighth cross sectional areas, in each case, at least equals the respective first coefficients of expansion $a_7$, $a_8$ of the seventh, and eighth, cross sectional areas and/or, in each case, corresponds at most to 1.2-times the respective first coefficients of expansion $a_7$, $a_8$ of the seventh, and eighth, cross sectional areas.

In a sixth embodiment of the invention, it is, additionally, provided that for each of the cross sectional areas of the lumen the first expansion coefficient $a_i$ amounts to not less than 0.9 and/or no greater than 1.

In a seventh embodiment of the invention, it is, additionally, provided that for each of the cross sectional areas of the lumen the second expansion coefficient $b_i$ amounts to not less than 0.4 and/or no greater than 1.

In a eighth embodiment of the invention, it is, additionally, provided that for each of the cross sectional areas of the lumen the first form coefficient $n_{1i}$ amounts to not less than 2 and/or no greater than 3.

In a ninth embodiment of the invention, it is, additionally, provided that for each of the cross sectional areas of the lumen the second form coefficient $n_{2i}$ amounts to not less than 2 and/or no greater than 3.

In a tenth embodiment of the invention, it is, additionally, provided that the geometric center of gravity of the first cross sectional area of the lumen has a separation $x_1$ from the second symmetry plane and the geometric center of gravity of the second cross sectional area of the lumen has a separation $x_2$ from the second symmetry plane, and a magnitude of each of the separations $x_1$, $x_2$ of the first and second cross sectional areas scaled to the radius $R_1(0°)$, respectively $R_2(0°)$ of the first, and second, cross sectional areas corresponds, in each case, to at least a 1.05-times, for example, at least a 1.2-times, the first coefficient of expansion $a_1$, $a_2$ of the first, and second, cross sectional areas and/or, in each case, at most 1.5-times, for example, at most 1.3-times, the respective first coefficient of expansion $a_1$, $a_2$ of the first, and second, cross sectional areas.

In an eleventh embodiment of the invention, it is, additionally, provided that none of the first coefficients of expansion $a_i$ of one of the coefficients sets $P_i$ is greater than the first expansion coefficient $a_1$ of the first coefficient set $P_1$.

In a twelfth embodiment of the invention, it is, additionally, provided that none of the second coefficients of expansion $b_i$ of one of the coefficients sets $P_i$ is greater than the second expansion coefficient $b_1$ of the first coefficients set $P_1$.

In a thirteenth embodiment of the invention, it is, additionally, provided that no cross sectional area has an area, which is greater than an area of the third cross sectional area.

In a fourteenth embodiment of the invention, it is, additionally, provided that no cross sectional area has an area, which is less than an area of the first cross sectional area or the second cross sectional area.

In a fifteenth embodiment of the invention, it is, additionally, provided that a ratio of an area of the third cross sectional area to an area of the first cross sectional area or the second cross sectional area is, in each case, greater than 1 and/or less than 1.5.

In a sixteenth embodiment of the invention, it is, additionally, provided that the separation $z_1$ of the first cross sectional area from the third cross sectional area equals the separation $z_2$ ($z_2=z_1$) of the second cross sectional area from the third cross sectional area.

In a seventeenth embodiment of the invention, it is, additionally, provided that the separation $z_1$ of the first cross sectional area from the third cross sectional area and/or the separation $z_2$ ($z_2=z_1$) of the second cross sectional area from the third cross sectional area corresponds to a length L of the lumen.

In an eighteenth embodiment of the invention, it is, additionally, provided: that the first flow divider opening is adapted to be connected, for example, by material bonding, with a, for example, hollow cylindrical, end section of a first fluid line, in such a manner that a lumen of the first fluid line communicates with the lumen of the flow divider to form a first flow path leading through the first flow divider opening; that the second flow divider opening is adapted to be connected, for example, by material bonding, with a, for example, hollow cylindrical, end section of a second fluid line, in such a manner that a lumen of the second fluid line communicates with the lumen of the flow divider to form a second flow path leading through the second flow divider opening for flow in parallel with the first flow path.

In a nineteenth embodiment of the invention, it is, additionally, provided that the wall of the flow divider is composed of a stainless steel, for example, a special steel, a duplex steel or a super duplex steel.

In a twentieth embodiment of the invention, it is, additionally, provided that the wall of the flow divider is composed of a nickel-molybdenum-alloy, especially a nickel-molybdenum-chromium-alloy.

In a twenty-first embodiment of the invention, it is, additionally, provided that the wall of the flow divider is composed of AISI 304, AISI 304L, AISI 316L, Material Number 1.4401, Material Number 1.4404, UNS S31603, Material Number 1.4410, Material Number 14501, Hastelloy B or Hastelloy C, for example, Hastelloy C-22.

In a first embodiment of the fluid line system, it is, additionally, provided that the wall of the first fluid line is composed of a stainless steel, especially a special steel, a duplex steel or a super duplex steel.

In a second embodiment of the fluid line system, it is, additionally, provided that the wall of the second fluid line is composed of a stainless steel, especially a special steel, a duplex steel or a super duplex steel.

In a third embodiment of the fluid line system, it is, additionally, provided that the wall of the first fluid line is composed of a nickel-molybdenum-alloy, for example, a nickel-molybdenum-chromium-alloy.

In a fourth embodiment of the fluid line system, it is, additionally, provided that the wall of the first fluid line is composed of a nickel-molybdenum-alloy, especially a nickel-molybdenum-chromium-alloy.

In a fifth embodiment of the fluid line system, it is, additionally, provided that the wall of the first fluid line is composed of AISI 304, AISI 304L, AISI 316L, Material Number 1.4401, Material Number 1.4404, UNS S31603, Material Number 1.4410, Material Number 14501, Hastelloy B or Hastelloy C, for example, Hastelloy C-22.

In a sixth embodiment of the fluid line system, it is, additionally, provided that the wall of the second fluid line is composed of AISI 304, AISI 304L, AISI 316L, Material Number 1.4401, Material Number 1.4404, UNS S31603, Material Number 1.4410, Material Number 14501, Hastelloy B or Hastelloy C, for example, Hastelloy C-22.

In a first further development of the fluid line system of the invention, such comprises, additionally, a second flow divider corresponding to a flow divider of the invention, for example, also constructed equally to the first flow divider, and both the first fluid line with its second line end as well as also the second fluid line with its second line end are, in each case, connected with the first flow divider end of the second flow divider, in such a manner that the lumen of the first fluid line communicates both with the lumen of the first flow divider as well as also with the lumen of the second flow divider to form a first flow path leading both through the first flow divider opening of the first flow divider as well as also through the first flow divider opening of the second flow divider and the lumen of the second fluid line communicates both with the lumen of the first flow divider as well as also with the lumen of the second flow divider to form a second flow path leading both through the second flow divider opening of the first flow divider as well as also through the second flow divider opening of the second flow divider, and connected for flow in parallel with the first flow path.

In a second further development of the fluid line system of the invention, such comprises, additionally, an electromechanical exciter arrangement, which is adapted to convert electrical power to mechanical power effecting mechanical oscillations of the first and second fluid lines.

In a third further development of the fluid line system of the invention, such comprises, additionally, a sensor arrangement, which is adapted to register mechanical oscillations of the first and second fluid lines and to provide at least one, for example, electrical, oscillatory signal representing oscillations of at least one of the first and second fluid lines.

A basic idea of the invention is to minimize the specific pressure loss of flow dividers by the fact that a fourth cross sectional area located in the vicinity of the above described, first cross sectional area, equally as well, removed from the above described second and third cross sectional areas, corresponds to a superellipse approximating a rectangular shape, and that a corresponding transitional region having only superelliptical cross sectional areas is formed between the above described, first cross sectional area and the above described second and third cross sectional areas. An advantage of the invention is especially that also in the case of application of the flow divider as line junction of a fluid line system, thus in the case of fluid allowed to flow through the flow divider in the direction of the first cross sectional area, a significant improving of the specific pressure loss, as well as also its stability, can be achieved compared with conventional flow dividers and fluid line systems formed therewith.

BRIEF DESCRIPTION OF THE DRAWINGS

The invention as well as advantageous embodiments thereof will now be explained in greater detail based on examples of embodiments shown in the figures of the drawing. Equal, or equally acting or equally functioning, parts are provided in all figures with equal reference characters; when perspicuity requires or it otherwise appears sensible, reference characters already shown in earlier figures are omitted in subsequent figures. Other advantageous embodiments or further developments, especially also combinations of, firstly, only individually explained aspects of the invention, result, furthermore, from the figures of the drawing and/or from the claims per se.

The figures of the drawing show as follows:

FIG. 6a, 6b shows schematically, other cross sectional areas of the lumen of FIG. 4, namely cross sectional areas located between the cross sectional area of FIG. 5b and each of the cross sectional areas of FIG. 5a;

FIG. 7a, shows schematically another cross sectional area of the lumen of FIG. 4, namely a cross sectional area located between the cross sectional areas of FIGS. 6a, 6b and each of the cross sectional areas of FIG. 5a;

FIG. 7b shows schematically, other cross sectional areas of the lumen of FIG. 4, namely, cross sectional areas located between the cross sectional area of FIG. 7a and each of the cross sectional areas of FIG. 5a;

DETAILED DESCRIPTION

Figure 1:
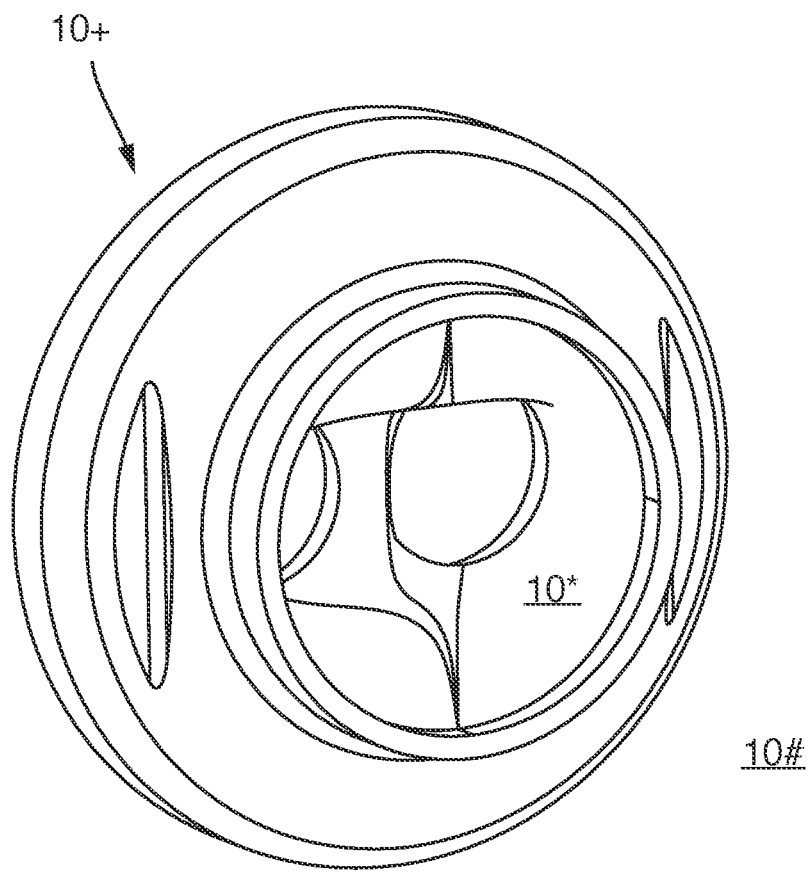
FIG. 1 shows schematically in a perspective, side view a flow divider.
Figure 2A:
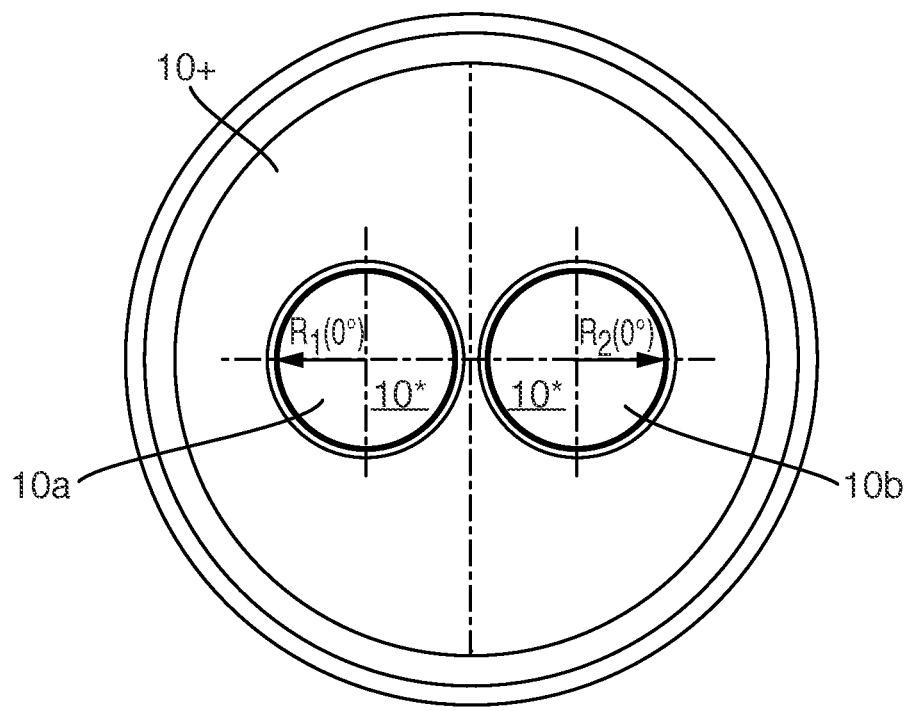
FIG. 2a, 2b shows schematically in additional, different side views a flow divider of FIG. 1.
Figure 2B:
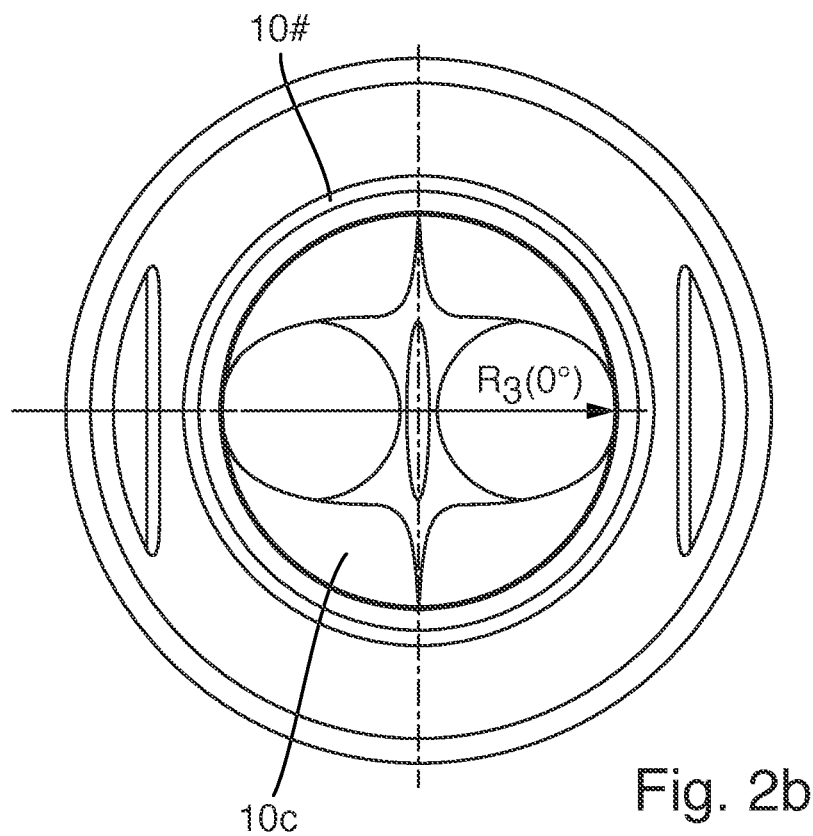

Shown schematically in FIGS. 1, 2a, 2b in different side views, an example of an embodiment of a flow divider of the invention, for example, namely a flow divider for connecting fluid lines serving for conveying a flowing fluid. The flow divider has a lumen 10* surrounded by a wall, for example, a wall of a metal. As shown in FIGS. 2a and 2b, in each case, or as directly evident from a combination of FIGS. 1, 2a and 2b, lumen 10* extends both from a first flow divider opening 10a located in a first flow divider end 10+ as well as also from a second flow divider opening 10b located in the flow divider end 10+, and, equally as well, spaced from the flow divider opening 10a, to a circularly shaped third flow divider opening 10c located in a second flow divider end 10 #. In an embodiment of the invention, the wall of the flow divider is composed of a stainless steel, for example, a special steel, especially AISI (American Iron and Steel Institute) 304, AISI 304L, AISI 316L, Material Number 1.4401, Material Number 1.4404 or UNS (Unified Numbering System for Metals and Alloys) S31603, a duplex steel, a super duplex steel, especially Material Number 1.4410 or Material Number 14501, a nickel-molybdenum-alloy, especially Hastelloy B, a nickel-molybdenum-chromium-alloy, especially Hastelloy C, or Hastelloy C-22. Alternatively or supplementally, the flow divider of the invention can, for example, also be made by an additive, or generative, production method, for example, a 3D-printing method.

For easy, equally as well, leakage free connecting of the flow divider 10 with a pipeline, the flow divider end 10 #can, for example, be held by a, in given cases, also standardized, connecting flange, or communicate with a connection nozzle, in given cases, a connection nozzle also held by such a connecting flange. The flow divider of the invention can, for example, additionally, also be a, in given cases, also integral, component of a fluid line system for conveying a flowing fluid, for example, be used in such a fluid line system—, as well as also shown schematically in FIG. 3a—as a line branching or—, as well as also shown schematically in FIG. 3b—as a line junction.

Figure 3A:
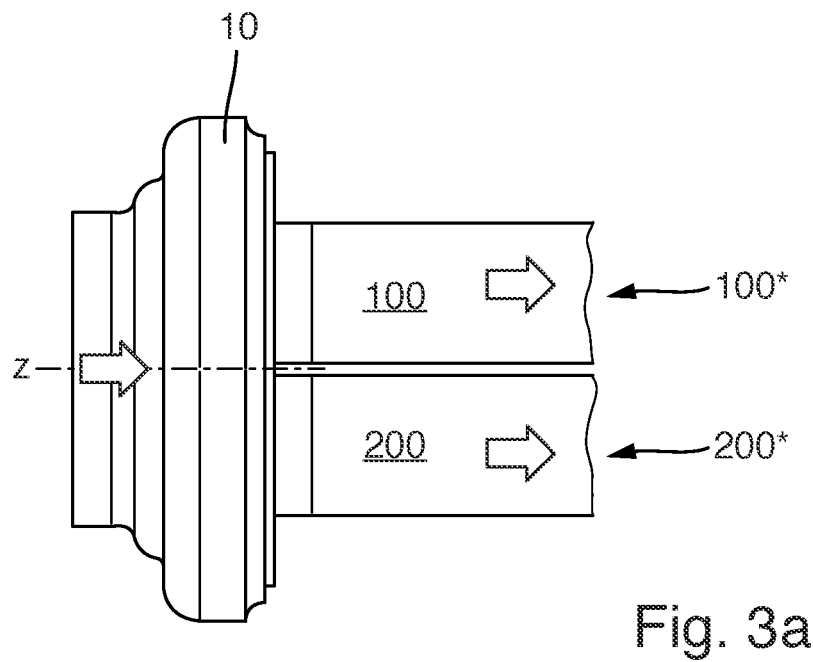
FIG. 3a, 3b shows schematic applications of a flow divider of FIG. 1 in the form of fluid line systems formed by means of a flow divider of FIG. 1.
Figure 3B:
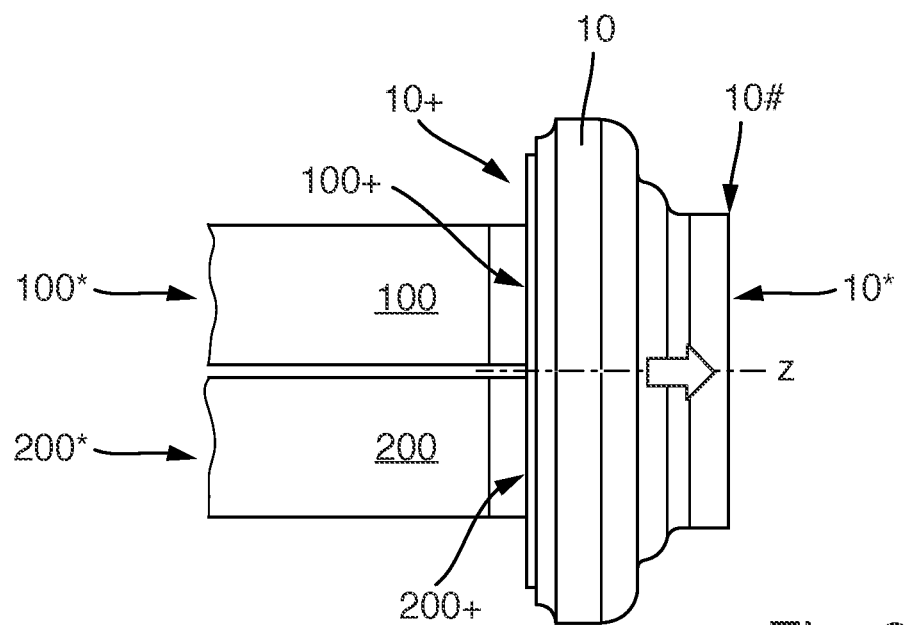

Accordingly, in an embodiment of the invention, the flow divider opening 10a of the flow divider 10 is, furthermore, adapted to be connected, in given cases, also by material bonding, with a—, for example, hollow cylindrical—end section of a first fluid line 100, in such a manner that—, as well as also shown in FIG. 3a—a lumen 100* of the fluid line 100 communicates with the lumen 10* to form a first flow path leading through the flow divider opening 10a, and the second flow divider opening 10b is adapted to be connected, especially by material bonding, with a—, for example, hollow cylindrical—end section of a second fluid line 200, in such a manner that—, as well as also shown in FIGS. 3a, 3b—a lumen 200* of the fluid line 200 communicates likewise with the lumen 10* to form a second flow path leading through the flow divider opening 10b, for example, for flow in parallel with the first flow path. The above-mentioned fluid line system can, in turn, also be a component of a measuring transducer, for example, a vibronic measuring transducer, for instance, according to one of the above mentioned patent applications, or patents, EP-A 816 807, US-A 2001/0037690, US-A 2008/0184816, US-A 2017/0219398, U.S. Pat. Nos. 4,823,613, 5,602,345, 5,796,011, WO-A 90/15310, WO-A 00/08423, WO-A 2006/107297, WO-A 2006/118557, WO-A 2008/059262, WO-A 2008/013545, WO-A 2009/048457, WO-A 2009/078880, WO-A 2009/120223, WO-A 2009/123632, WO-A 2010/059157, WO-A 2013/006171, WO-A 2013/070191, WO-A 2015/162617, WO-A 2015085025 or WO-A 2017/198440, or a, in given cases, vibronic, measuring system formed by means of such a measuring transducer, for example, a Coriolis-mass flow-measuring device or density-measuring device. Alternatively or supplementally, the fluid line system can, for example, also be a component of a transfer site for legally regulated traffic in goods, such as e.g. a dispensing plant, or transfer site, for fuels. In the case of the at least one measured variable, such can, accordingly, be, for example, a density, a viscosity or temperature of the fluid. The measured variable can, however, for example, also be a flow parameter of the fluid, for example, a mass flow or a volume flow. Particularly for the above described case, in which the fluid line system is a component of a vibronic measuring transducer, or a vibronic measuring system formed therewith, in an additional embodiment of the invention, at least the fluid line 100 is, additionally, adapted to be flowed through by fluid and during that to be caused to vibrate. Moreover, the fluid line 200 can also be adapted to be flowed through by fluid and during that to be caused to vibrate; this, for example, also in such a manner that the two fluid lines 100, 200 are flowed through by fluid at the same time and/or during that, at the same time, caused to vibrate, especially opposite-equally.

Figure 4:
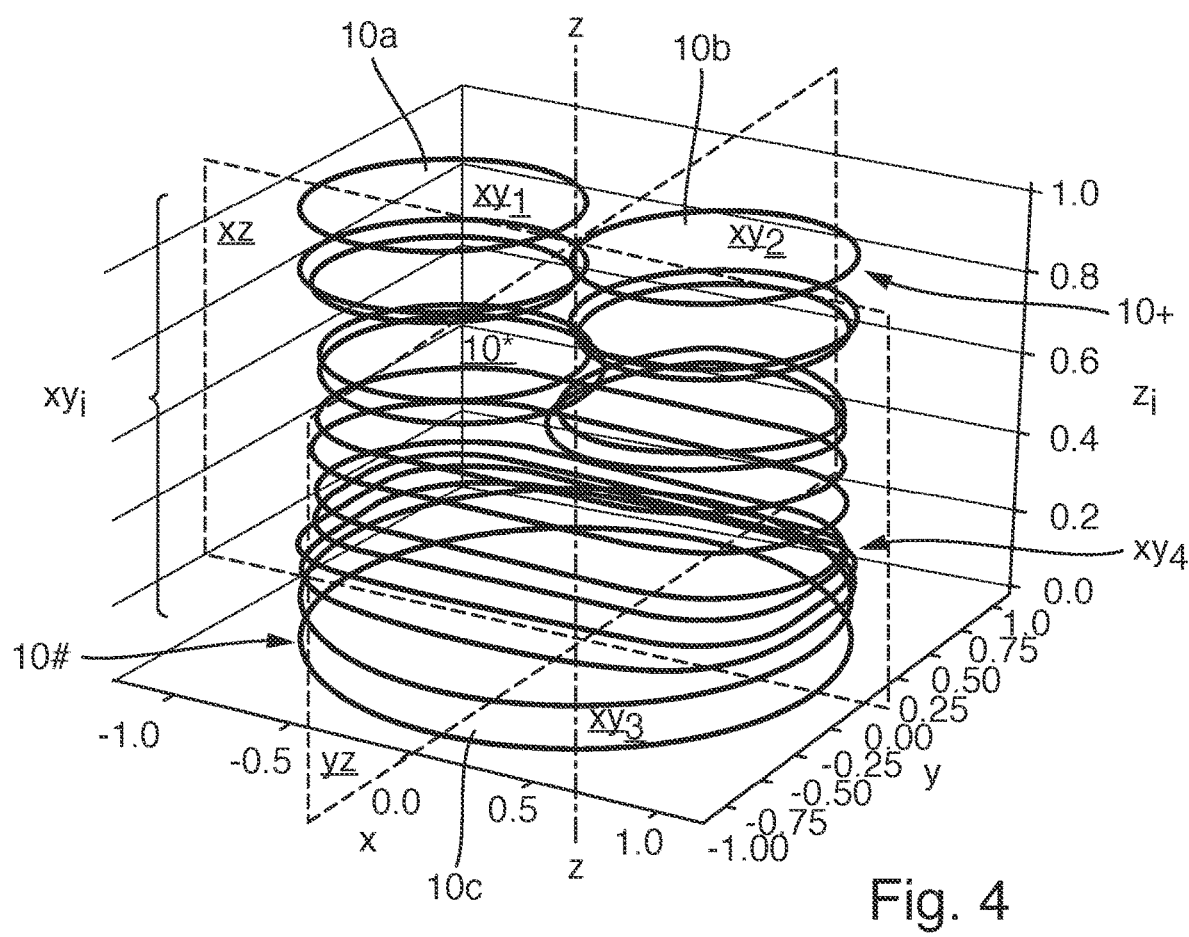
FIG. 4 shows in a three dimensional graph, different cross sectional areas of a lumen of a flow divider of FIG. 1, thus corresponding flow cross sections of the flow divider.
Figure 5A:
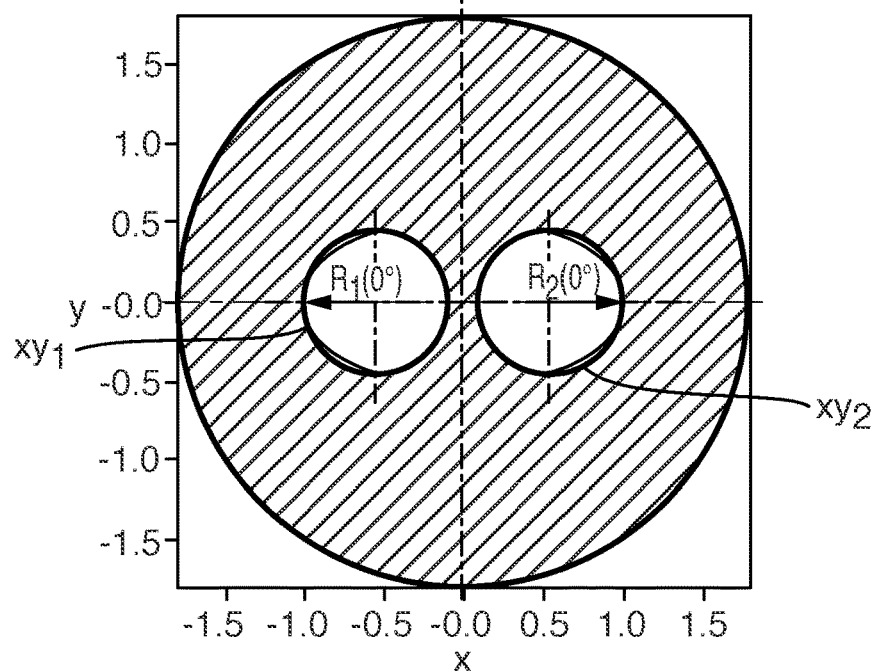
FIG. 5a, 5b shows schematically, different cross sectional areas of a lumen of FIG. 4.
Figure 5B:
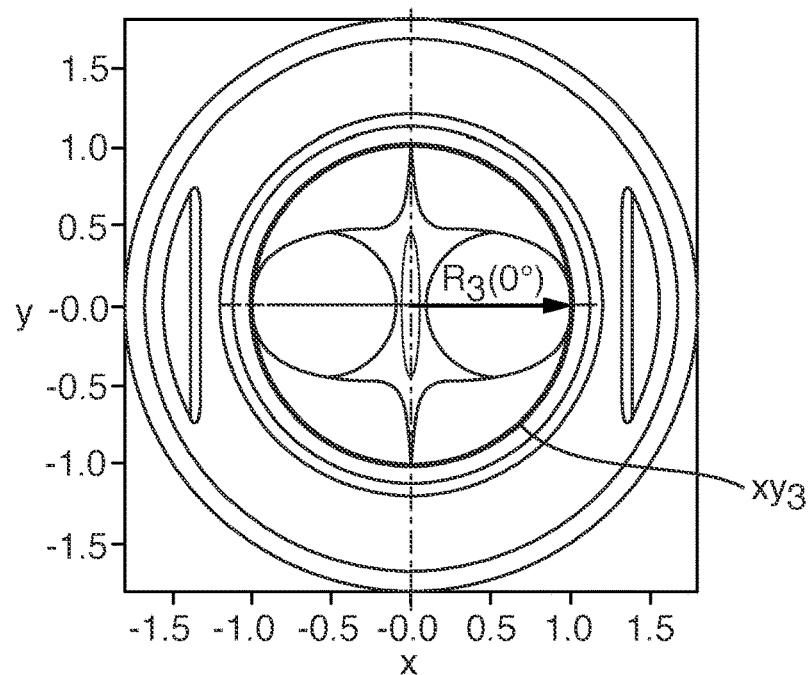
Figure 6A:
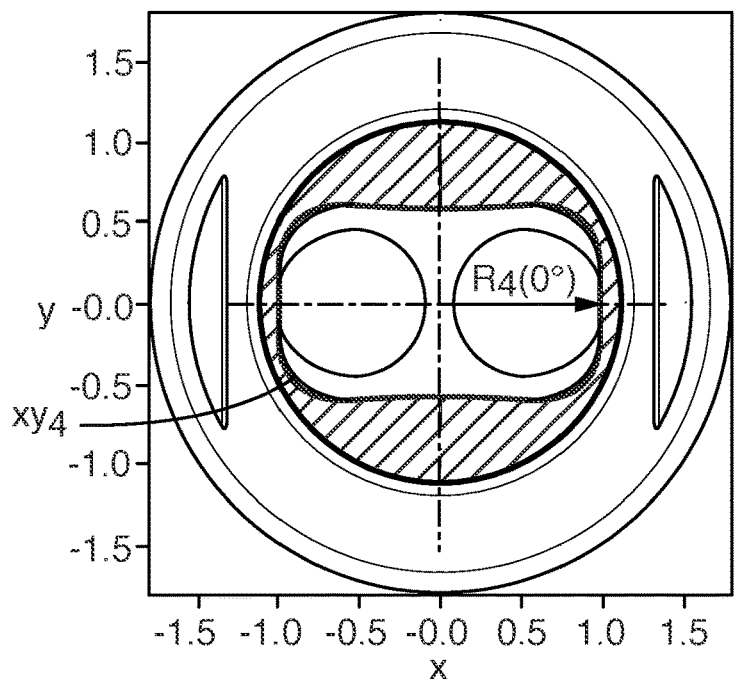
Figure 6B:
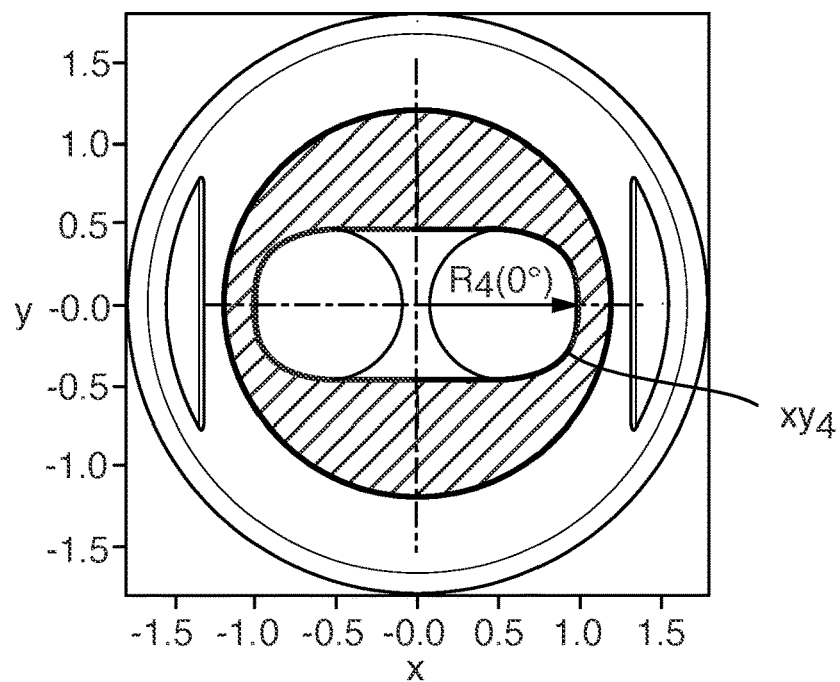

As shown schematically in FIG. 4, or as directly evident from a combination of FIGS. 1, 2a, 2b and 4, the lumen 10* of the flow divider 10 of the invention has a principal axis of inertia z imaginarily connecting the first and second flow divider ends 10+, 10 #. Additionally, the lumen 10* is mirror symmetrical, in such a manner that the lumen 10* has a first symmetry plane xz and a second symmetry plane yz perpendicular thereto. The first and second symmetry planes yz, xz imaginarily intersect one another in the principal axis of inertia z, and the lumen 10* has planar cross sectional areas $xy_i$ perpendicular to the principal axis of inertia z, with, in each case, a geometric center of gravity located in the first symmetry plane xz. Of the above described cross sectional areas $xy_i$, a first cross sectional area $xy_1$, located in the flow divider end 10+, equally as well, having its geometric center of gravity removed from the principal axis of inertia z, consequently having a separation $x_1$ from the symmetry plane yz, corresponds to the flow divider opening 10a, a second cross sectional area $xy_2$ likewise located in the flow divider end 10+, equally as well, having its geometric center of gravity both removed from the geometric center of gravity of the cross sectional area $xy_1$ as well as also from the principal axis of inertia z of the lumen 10*, consequently having a separation $x_2$ from the symmetry plane yz, corresponds to the flow divider opening 10b, and a circular, third cross sectional area $xy_3$ located in the second flow divider end 10 #and having its geometric center of gravity on the principal axis of inertia z, corresponds to the flow divider opening 10c. Since the lumen 10* is mirror symmetric in the above described manner, the above described separations x1, x2 are equal and the two, for example, in each case, also circularly shaped, cross sectional areas $xy_1$, $xy_2$ are correspondingly congruent relative to one another. In an additional embodiment of the invention, the flow divider 10, or its lumen 10*, is, additionally, so embodied that a ratio of an area of the cross sectional area $xy_3$ to an area of the cross sectional area $xy_1$, or the cross sectional area $xy_2$ is, in each case, greater than 1 and/or less than 1.5. Alternatively or supplementally, the flow divider 10, or its lumen 10*, can, furthermore, be so embodied that no cross sectional area $xy_i$ has an area, which is greater than the above-mentioned area of the cross sectional area $xy_3$, and/or that no cross sectional area $xy_i$ has an area, which is less than an area of the cross sectional area $xy_1$ or the cross sectional area $xy_2$.

According to the nature of the flow divider, each of the above described cross sectional areas $xy_i$ of the lumen 10* has, as well as also shown schematically in FIG. 4, or directly evident from a combination of FIGS. 4, 5a, 5b, 6a, 6b, 7a, 7b, furthermore, in each case, a plurality of radii $R_i$ differing from one another and/or equal to one another, as well as, in each case, a separation $z_i$ from the cross sectional area $xy_3$, measured as a separation between a projection of the geometric center of gravity of the given cross sectional area $xy_i$ onto the principal axis of inertia z to the geometric center of gravity of the cross sectional area $xy_3$. The separation $z_1$ of the cross sectional area $xy_1$ from the cross sectional area $xy_3$ is, in such case, equal to the separation $z_2$ ($z_2=z_1$) of the cross sectional area $xy_2$ from the cross sectional area $xy_3$. Additionally, the above-mentioned separation $z_1$, or the separation $z_2$ ($z_2=z_1$) can correspond to a (total-) length L of the lumen 10*, and thus to a structural length of the flow divider 10. Moreover, the lumen 10* has, furthermore, for initiating a dividing into flow portions, or for bringing flow portions back together, a bifurcation (forking point), or perhaps more accurately, a bifurcation area $xy_B$, namely a cross sectional area forming with its geometric center of gravity the bifurcation. In an additional embodiment of the invention, it is provided that a separation $z_B$ of the bifurcation area $xy_B$ from the cross sectional area $xy_3$ amounts to greater than 55% of the separation $z_1$ ($z_B>0.55 \cdot z_1$) and/or less than 65% of the separation $z_1$ ($z_B<0.65 \cdot z_1$).

As also shown in FIGS. 5a, 5b, 6a, 6b, 7a, 7b, each of the above described radii $R_i$ of each cross sectional area $xy_i$ extends, in each case, from the particular geometric center of gravity of the cross sectional area $xy_i$ to the wall and has, in each case, an angle $\varphi$ ($-180° \leq \varphi \leq 180°$) from a reference axis $x_i$, namely an imaginary axis lying both in the particular cross sectional area $xy_i$ as well also in the first symmetry plane xz of the lumen 10* and, additionally, being perpendicular to its principal axis of inertia z, wherein each radius $R_i(0°)$ extending at an angle $\varphi=0°$ to the relevant reference axis $x_i$, in each case, points away from the symmetry plane yz of the lumen 10*. Additionally, each radius $R_i(\varphi)$ of each cross sectional area $xy_i$ fulfills, in each case, a formula $f_i(\varphi, P_i)$ defined by a coefficients set (parameter vector) $P_i$ ($P_i=[a_i\ b_i\ m_{1i}\ m_{2i}\ n_{1i}\ n_{2i}\ n_{3i}]$) for the particular cross sectional area $xy_i$ and containing seven coefficients, namely, in each case, a first coefficient of expansion $a_i$, a second coefficient of expansion $b_i$, a first symmetry coefficient $m_{1i}$, a second symmetry coefficient $m_{2i}$, a first form coefficient $n_{1i}$, a second form coefficient $n_{2i}$ and a third form coefficient $n_{3i}$, consequently parameterized with only a few variables, and, in each case, scaled to the greatest radius $R_0$ of the third cross sectional area $xy_3$ ($R_i(\varphi)/R_0 \rightarrow r_i(\varphi)$):

$$R_i(\varphi) = R_0 \cdot r_i(\varphi) = f_i(\varphi, P_i) = f_i(\varphi, [a_i\ b_i\ m_{1i}\ m_{2i}\ n_{1i}\ n_{2i}\ n_{3i}])$$

$$= R_0 \cdot {}^{-n_{1i}}\!\sqrt{\left|\frac{1}{a_i}\cos\!\left(\frac{m_{1i}}{4}\varphi\right)\right|^{n_{2i}} + \left|\frac{1}{b_i}\sin\!\left(\frac{m_{2i}}{4}\varphi\right)\right|^{n_{3i}}}.$$

Accordingly, the radii $R_1(\varphi)$ of the cross sectional area $xy_1$ fulfill a first formula $f_1(\varphi, P_1)$ defined by a first coefficients set $P_1=[a_1\ b_1\ m_{11}\ m_{21}\ n_{11}\ n_{21}\ n_{31}]$, the radii $R_2(\varphi)$ of the cross sectional area $xy_2$ fulfill a second formula $f_2(\varphi, P_2)$ defined by a second coefficients set $P_2=[a_2\ b_2\ m_{12}\ m_{22}\ n_{12}\ n_{22}\ n_{32}]$, and the radii $R_3(\varphi)$ of the cross sectional area $xy_3$ fulfill a third formula $f_3(\varphi, P_3)$ defined by a third coefficients set $P_3=[a_3\ b_3\ m_{13}\ m_{23}\ n_{13}\ n_{23}\ n_{33}]$, wherein the coefficients set $P_1$ for the radii $R_1(\varphi)$ is determined with $a_1=(0.4 \ldots 0.5)$, $b_1=(0.4 \ldots 0.5)$, $m_{11}=4$, $m_{21}=4$, $n_{11}=(2 \ldots 3)$, for example, with $n_{11}=2.8$, $n_{21}=(2 \ldots 3)$, for example, with $n_{21}=2.2$ and $n_{31}=(2 \ldots 3)$, for example, with $n_{31}=2.2$. Since—such as already indicated—the two cross sectional area $xy_1$, $xy_2$ are embodied to be congruent, the two formulae $f_1(\varphi, P_1)$, $f_2(\varphi, P_2)$ are equal, and, correspondingly, the coefficients sets $P_1$, $P_2$ are equal, i.e. $P_2=P_1$, consequently $a_2=a_1$, $b_2=b_1$, $m_{12}=m_{11}$, $m_{22}=m_{21}$, $n_{12}=n_{11}$, $n_{22}=n_{21}$ and $n_{32}=n_{31}$. For the mentioned case, in which the two cross sectional area $xy_1$, $xy_2$ are circular, is, additionally, the coefficient of expansion $b_1$ of the coefficients set $P_1$ and the coefficient of expansion $b_2$ of the coefficients set $P_2$ are each selected equal to the coefficient of expansion $a_1$, such that, thus, $b_1=b_2=a_1 \rightarrow R_1(\varphi)=R_2(\varphi)=a_1 \cdot R_0=$const. For the coefficients set $P_3$ for determining the radii $R_3(\varphi)$ of the circularly shaped cross sectional area $xy_3$, $b_3=a_3$, $m_{13}=4$, $m_{23}=m_{13}$, $n_{13}=2$, $n_{23}=n_{13}$ and $n_{33}=n_{13}$, wherein, in turn, its expansion coefficient $a_3$ is set equal to one ($a_3=1$).

In an additional embodiment of the invention, the flow divider 10, and its lumen 10\*, are so embodied that a magnitude of each of the above described separations $x_1$, $x_2$ of the geometric centers of gravity of the cross sectional areas $xy_1$, $xy_2$ scaled to the radius $R_1(0°)$, respectively $R_2(0°)$ of the respective first, and second, cross sectional areas corresponds, in each case, to at least 1.05-times ($x_1/R_1(0°) \geq 1.05 \cdot a_1$, $x_2/R_2(0°) \geq 1.05 \cdot a_2$), especially at least 1.2-times ($x_1/R_1(0°) \geq 1.2 \cdot a_1$, $x_2/R_2(0°) \geq 1.2 \cdot a_2$), the first coefficient of expansion $a_1$. $a_2$ and/or, in each case, at most 1.5-times ($x_1/R_1(0°) \leq 1.5 \cdot a_1$, $x_2/R_2(0°) \leq 1.5 \cdot a_2$), especially at most 1.3-times ($x_1/R_1(0°) \leq 1.3 \cdot a_1$, $x_2/R_2(0°) \leq 1.3 \cdot a_2$), the first coefficient of expansion $a_1$. $a_2$.

In an additional embodiment of the invention, the flow divider 10, and its lumen 10\* are so embodied that for each of the above described cross sectional areas $xy_i$ of the lumen 100, and each of the above described coefficients sets $P_i$, the first expansion coefficient $a_i$ amounts to not less than 0.9 and/or no greater than 1, and/or that for each of the cross sectional areas $xy_i$, and each of the above described coefficients sets $P_i$, the second expansion coefficient $b_i$ amounts to not less than 0.4 and/or no greater than 1. Alternatively or supplementally, the flow divider 10 is, furthermore, so embodied that of each of the above described cross sectional areas $xy_i$, and each of the above described coefficients sets $P_i$, the first form coefficient $n_{1i}$ amounts to not less than 2 and/or no greater than 3, and/or that for each of the above described cross sectional areas $xy_i$, and each of the above described coefficients sets $P_i$, the second form coefficient $n_{2i}$ amounts to not less than 2 and/or no greater than 3. Particularly for the above-described case, in which none of the cross sectional areas $xy_i$ should have an area, which is greater than the surface area of the cross sectional area $xy_3$, it is, additionally, provided that none of the first coefficients of expansion $a_1$ of one of the coefficients sets $P_i$ is greater than the expansion coefficient $a_1$ of the coefficients set $P_1$ or of the associated cross sectional area $xy_1$ and/or none of the second coefficients of expansion $b_i$ of one of the coefficients sets $P_i$ is greater than the expansion coefficient $b_1$ of the coefficients set $P_1$ or of the associated cross sectional area $xy_1$.

The lumen 10\* of the flow divider 10 has, according to the invention, furthermore, at least a fourth cross sectional area $xy_4$, which lies with its geometric center of gravity likewise on the principal axis of inertia z of the lumen 10\*. Cross sectional area $xy_4$ is located in the flow divider at a separation $z_4$ from the cross sectional area $xy_3$, which amounts to greater than 20% of the separation $z_1$ ($z_4 > 0.2 \cdot z_1$) and less than 45% of the separation $z_1$ ($z_4 < 0.45 \cdot z_1$). According to the invention, the cross sectional area $xy_4$ is, additionally, so embodied that its radii $R_4(\varphi)$ fulfill a fourth formula $f_4(\varphi, P_4)$ defined by a fourth coefficients set $P_4=[a_4\ b_4\ m_{14}\ m_{24}\ n_{14}\ n_{24}\ n_{34}]$ with $a_4=(0.95\ldots 1)$, $b_4=(0.45\ldots 0.7)$, $m_{14}=4$, $m_{24}=4$, $n_{13}=3.0$, $n_{24}=n_{14}$ and $n_{34}=(3\ldots 4)$, consequently that—, as well as also shown, in each case, in FIGS. 6a and 6b—the cross sectional area $xy_4$ corresponds to a superellipse approximating a rectangular shape.

In an additional embodiment of the invention, it is, furthermore, provided that a ratio $n_{34}/b_4$ of the above described form coefficient $n_{34}$ to the above described coefficient of expansion $b_4$ amounts to not less than 5.5 and/or no greater than 7 and/or that the radii $R_4(\varphi)$ of the above described flow cross section $xy_4$ correspond as a function of the separation $z_4$ from cross sectional area $xy_3$ to one or more of the following coefficients sets $P_4$:

| $z_4$ | $a_4$ | $b_4$ | $m_{14}$ | $m_{24}$ | $n_{14}$ | $n_{24}$ | $n_{34}$ |
|---|---|---|---|---|---|---|---|
| 0.202 | 0.98 | 0.64 | 4 | 4 | 3 | 3 | 3.8 |
| 0.23 | 0.98 | 0.6 | 4 | 4 | 3 | 3 | 3.8 |
| 0.25 | 0.98 | 0.55 | 4 | 4 | 3 | 3 | 3.2 |
| 0.27 | 0.98 | 0.55 | 4 | 4 | 3 | 3 | 3.2 |
| 0.299 | 0.98 | 0.5 | 4 | 4 | 3 | 3 | 3.2 |
| 0.4 | 1 | 0.48 | 4 | 4 | 3 | 3 | 3.2 |

In another embodiment of the invention, it is, additionally, provided that none of the cross sectional areas $xy_i$ of the lumen 10\*, which are located between the above described superelliptical cross sectional area $xy_4$ and the cross sectional areas $xy_1$, $xy_2$ or whose separation $z_i$ from the cross sectional area $xy_3$ is greater than the separation $z_4$ and less than the separation $z_1$, $z_2$, especially at least less than 95% of the separation $z_1$, $z_2$, is embodied circularly and/or that also none of the cross sectional areas $xy_i$ of the lumen 10\*, whose separation $z_i$ from the cross sectional area $xy_3$ is less than the above-mentioned separation $z_4$ and at least greater than 0.1, is embodied circularly shaped. Alternatively thereto or in supplementation thereof, it is, additionally, provided that no others of the cross sectional areas $xy_i$ have the third form coefficient $n_{3i}$ greater than the above-mentioned form coefficient $n_{34}$.

In an additional embodiment of the invention, the lumen 10\* has, accordingly—particularly also for the purpose of forming a (first) transitional region mediating between the circularly shaped cross sectional area $xy_3$ and the superelliptical cross sectional area $xy_4$ of the lumen 10\* with as little pressure loss as possible—, furthermore, a fifth cross sectional area $xy_5$, which lies with its geometric center of gravity likewise on the principal axis of inertia z, and, indeed, at a separation $z_5$ from the cross sectional area $xy_3$, which amounts to not less than 10% of the separation $z_1$ ($z_5 \geq 0.1 \cdot z_1$) and no greater than 20% of the separation $z_1$ ($z_5 \leq 0.2 \cdot z_1$), and whose radii $R_5(\varphi)$ fulfill a fifth formula $f_5(\varphi, P_5)$ defined by a fifth coefficients set $P_5=[a_5\ b_5\ m_{15}\ m_{25}\ n_{15}\ n_{25}\ n_{35}]$ determined with $a_5=(0.97\ldots 1)$, $b_5=(0.65\ldots 1)$, $m_{15}=4$, $m_{25}=4$, $n_{15}=3$, $n_{25}=3$ and $n_{35}=(2\ldots 3.5)$. In order to be able to make the above described transitional region effectively proficient, namely effecting disturbances in the flow profile as little as possible, and causing as little as possible pressure loss, equally as well as short as possible in the direction of the principal axis of inertia z, it is, in an additional embodiment of the invention, furthermore, provided that the above-mentioned expansion coefficient $b_5$ fulfills, as a function of its separation $z_5$, normalized to the separation $z_1$ of the first cross sectional area $xy_1$, a formula:

$$b_5 = (47.2 \ldots 47.8) \cdot \left(\frac{z_5}{z_1}\right)^2 - (17.5 \ldots 17.18) \cdot \left(\frac{z_5}{z_1}\right) + (2.2 \ldots 2.4),$$

for example, $$b_5 = 47.51 \cdot \left(\frac{z_5}{z_1}\right)^2 - 17.88 \cdot \left(\frac{z_5}{z_1}\right) + 2.31,$$

and/or that the above-mentioned form coefficient $n_{35}$ fulfills, as a function of its separation $z_5$, normalized to the separation $z_1$ of the first cross sectional area ($xy_1$), a formula:

$$n_{35} = (2.4 \ldots 2.6) \cdot \left(\frac{z_5}{z_1}\right) + (7.7 \ldots 8),$$

for example, $$n_{35} = 2.55 \cdot \left(\frac{z_5}{z_1}\right) + 7.87.$$

Alternatively or supplementally, in an additional embodiment of the invention, it is provided that the radii $R_5(\varphi)$ of the above described cross sectional area $xy_5$ correspond, as a function of the separation $z_5$ from the cross sectional area $xy_3$, to one or more of the following coefficients sets $P_5$:

| $z_5$ | $a_5$ | $b_5$ | $m_{15}$ | $m_{25}$ | $n_{15}$ | $n_{25}$ | $n_{35}$ |
|---|---|---|---|---|---|---|---|
| 0.1 | 1 | 1 | 4 | 4 | 2 | 2 | 2 |
| 0.12 | 1 | 0.9 | 4 | 4 | 3 | 3 | 2 |
| 0.13 | 0.98 | 0.8 | 4 | 4 | 3 | 3 | 3 |
| 0.14 | 0.98 | 0.75 | 4 | 4 | 3 | 3 | 3 |
| 0.15 | 0.98 | 0.7 | 4 | 4 | 3 | 3 | 3 |

Figure 7A:
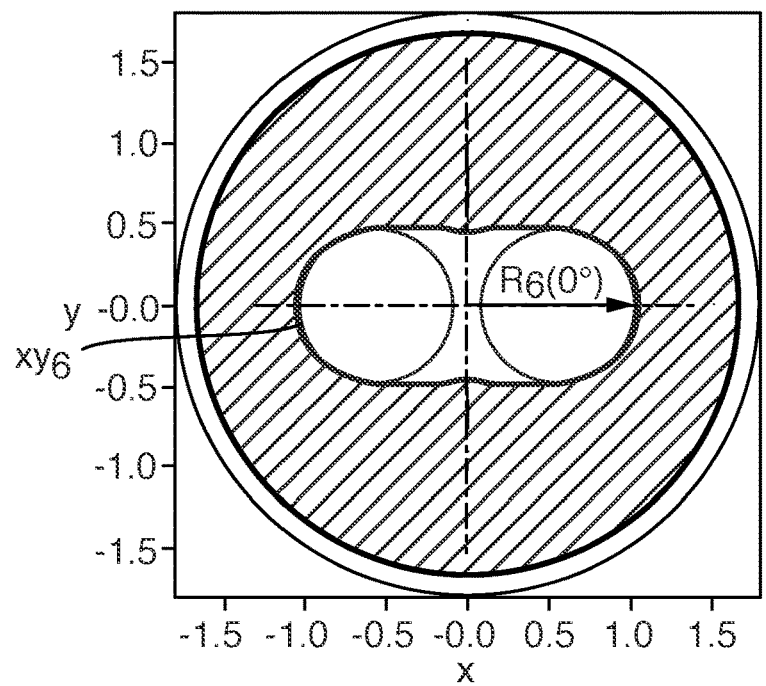

In an additional embodiment of the invention, the lumen 10* has—particularly also for the purpose of forming a (second) transitional region mediating between the superelliptical cross sectional area $xy_4$ of the lumen 10* and the above described bifurcation area with as little as possible pressure loss—, furthermore, a sixth cross sectional area $xy_6$, which—, as well as also shown in FIG. 7a—lies with its geometric center of gravity on the principal axis of inertia z, namely at a separation $z_6$ from the cross sectional area $xy_3$, which amounts to greater than 45% of the separation $z_1$ ($z_6>0.45 \cdot z_1$) and less than 60% of the separation $z_1$ ($z_6<0.6 \cdot z_1$), and whose radii $R_6(\varphi)$ fulfill a sixth formula $f_6(\varphi, P_6)$ defined by a sixth coefficients set $P_6=[a_6\ b_6\ m_{16}\ m_{26}\ n_{16}\ n_{26}\ n_{36}]$ defined with $a_6=(0.98 \ldots 1)$, $b_6=(0.7 \ldots 0.8)$, $m_{16}=4$, $m_{26}=4$, $n_{16}=1$, $n_{26}=(2 \ldots 2.5)$ and $n_{36}=(2.1 \ldots 2.8)$; this, especially, in such a manner that its third form coefficient $n_{36}$, as a function of the separation $z_6$, normalized to the separation $z_1$, fulfills a formula:

$$n_{36} = (3.4 \ldots 3.6) \cdot \left(\frac{z_6}{z_1}\right) + (0.5 \ldots 0.7),$$

for example, namely $$n_{36} = 3.57 \cdot \left(\frac{z_6}{z_1}\right) + 0.64.$$

Alternatively or supplementally, in an additional embodiment of the invention, it is provided that the radii $R_6(\varphi)$ of the above described cross sectional area $xy_6$ as a function of the separation $z_6$ from the cross sectional area $xy_3$, correspond to one or more of the following coefficients sets $P_6$:

| $z_6$ | $a_6$ | $b_6$ | $m_{16}$ | $m_{26}$ | $n_{16}$ | $n_{26}$ | $n_{36}$ |
|---|---|---|---|---|---|---|---|
| 0.492 | 0.99 | 0.72 | 4 | 4 | 1 | 2.1 | 2.4 |
| 0.55 | 0.99 | 0.75 | 4 | 4 | 1 | 2.1 | 2.6 |

Figure 7B:
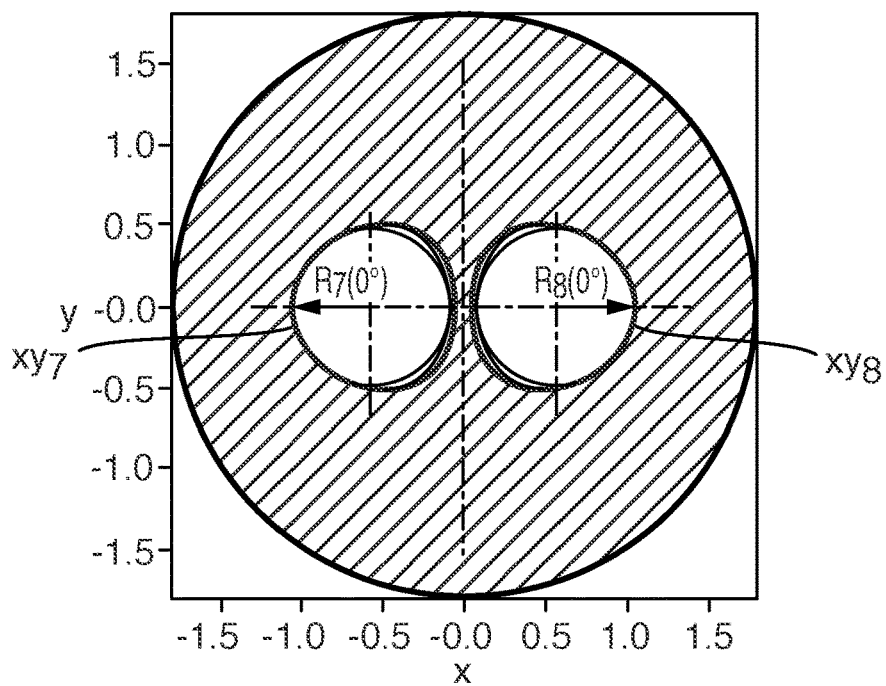

Particularly also for the purpose of forming a transitional region mediating between the above described bifurcation area and the, in given cases, circularly shaped cross sectional area $xy_1$, and the, in given cases, likewise circularly shaped cross sectional area $xy_2$, the lumen 10* of an additional embodiment of the invention, such as also indicated in FIG. 7b, has, furthermore, a seventh cross sectional area $xy_7$ removed with its geometric center of gravity from the principal axis of inertia z, located at a separation $z_7$ from the third cross sectional area $xy_3$, which amounts to greater than 70% of the separation $z_1$ ($z_7>0.7\ z_1$) and less than 95% of the separation $z_1$ ($z_7<0.95 \cdot z_1$), as well as an eighth cross sectional area $xy_8$ removed with its geometric center of gravity both from the principal axis of inertia z as well as also from the geometric center of gravity of the above described cross sectional area $xy_7$, and located at a separation $z_8$ from the third cross sectional area $xy_3$, which equals the separation $z_7$. The radii $R_7(\varphi)$ of the cross sectional area $xy_7$ fulfill a seventh formula $f_5(\varphi, P_7)$ defined by a seventh coefficients set $P_7=[a_7\ b_7\ m_{17}\ m_{27}\ n_{17}\ n_{27}\ n_{37}]$ with $a_7=(0.40 \ldots 0.55)$, $b_7=a_7$, $m_{17}=3\ m_{27}=3\ n_{17}=(2.7 \ldots 2.8)$, $n_{27}=(2.3 \ldots 2.5)$ and $n_{37}=n_{27}$. Moreover, it is provided that the cross sectional area $xy_8$—, as well as also directly evident from FIG. 7b—is congruent with the cross sectional area $xy_7$, consequently that the radii $R_8(\varphi)$ fulfill an eighth formula $f_8(\varphi, P_8)$ defined by an eighth coefficients set $P_8=[a_8\ b_8\ m_{18}\ m_{28}\ n_{18}\ n_{28}\ n_{38}]$ with $a_8=a_7$, $b_8=b_7$, $m_{18}=m_{17}$, $m_{28}=m_{27}$, $n_{18}=n_{17}$, $n_{28}=n_{27}$ and $n_{38}=n_{37}$; this, especially, also in such a manner that the geometric center of gravity of the cross sectional area $xy_7$ has a separation $x_7$ from the second symmetry plane yz and the geometric center of gravity of the cross sectional area $xy_8$ has a separation $x_8$ from the second symmetry plane yz, and a magnitude of each of the separations $x_7$, $x_8$ of the cross sectional area, $xy_7$, $xy_8$, scaled to the radius $R_7(0°)$, respectively $R_8(0°)$, of the seventh, and eighth, cross sectional areas $xy_7$, $xy_8$, in each case, at least equals the respective first coefficients of expansion $a_7$, $a_8$ of the seventh, and eighth cross sectional areas $xy_7$, $xy_8$ ($x_7/R_7(0°) \geq a_7$, $x_8/R_8(0°) \geq a_8$) and/or, in each case, corresponds at most to 1.2-times the first coefficients of expansion $a_7$, $a_8$ of the cross sectional areas $xy_7$, $xy_8$ ($x_7/R_7(0°) \leq 1.2 \cdot a_7$, $x_8/R_8(0°) \leq 1.2 \cdot a_8$). In an additional embodiment of the invention, it is, additionally, provided that the two coefficients of expansion $a_7$ and $b_7$ as a function of the selected separation $z_7$, normalized to the separation $z_1$, fulfill a formula:

$$a_7 = b_7 = 309.5\left(\frac{z_7}{z_1}\right)^3 - 705\left(\frac{z_7}{z_1}\right)^2 + 524.3\left(\frac{z_7}{z_1}\right) - 126$$

and/or that the two symmetry coefficients $m_{17}$ and $m_{27}$ as a function of the selected separation $z_7$, scaled to the separation $z_1$, fulfill a formula $$m_{17} = m_{27} = -205.4\left(\frac{z_7}{z_1}\right)^3 + 466.4\left(\frac{z_7}{z_1}\right)^2 - 345.3\left(\frac{z_7}{z_1}\right) + 86.7$$

and/or that the form coefficient $n_{17}$ as a function of the selected separation $z_7$, normalized to the separation $z_1$, fulfills a formula:

$$n_{17} = -1068\left(\frac{z_7}{z_1}\right)^3 + 2425.2\left(\frac{z_7}{z_1}\right)^2 - 1795.4\left(\frac{z_7}{z_1}\right) + 433$$

and/or that the form coefficients $n_{27}$ and $n_{37}$ as a function of the separation $z_7$, normalized to the separation $z_1$, fulfill a formula:

$$n_{27} = n_{37} = 71.4\left(\frac{z_7}{z_1}\right)^3 - 159\left(\frac{z_7}{z_1}\right)^2 + 115\left(\frac{z_7}{z_1}\right) - 24.4.$$

In an additional embodiment of the invention, it is, additionally, provided that the radii $R_{B1,i}(\varphi)$ of a ninth cross sectional area $xy_{B1,i}$ located between the previously indicated bifurcation area $xy_B$ and the above described cross sectional area $xy_7$ fulfill a ninth formula $f_9(\varphi, P_{B1})$ defined by a ninth coefficients set $P_{B1}=[a_{B1} \ b_{B1} \ m_{B11} \ m_{B12} \ n_{B11} \ n_{B12} \ n_{B13}]$ with $a_{B1}=(1.7 \ldots 1.8)$, $b_{B1}=a_{B1}$, $m_{B11}=3$, $m_{B12}=3$, $n_{B11}=-2.4$, $n_{B12}=(2.7 \ldots 2.8)$ and $n_{B12}=n_{B13}$ and that the radii $R_{B2,i}(\varphi)$ of a tenth cross sectional area $xy_{B2,i}$ located between the previously indicated bifurcation area $xy_B$ and the above described cross sectional area $xy_8$ fulfill a tenth formula $f_{10}(\varphi, P_{B2})$ defined by a tenth coefficients set $P_{B2}=[a_{B2} \ b_{B2} \ m_{B21} \ m_{B22} \ n_{B11} \ n_{B22} \ n_{B23}]$ with $P_{B2}=P_{B1}$; this, especially, in such a manner that the radii $R_{B1}(\varphi)$ as a function of the separation from the cross sectional area $xy_3$, consequently the radii $R_{B2}(\varphi)$ as a function of the separation $z_{B2}$, correspond to one or more of the following coefficients sets $P_{B1}$:

| $z_{B1}$ | $a_{B1}$ | $b_{B1}$ | $m_{B11}$ | $m_{B12}$ | $n_{B11}$ | $n_{B12}$ | $n_{B13}$ |
|---|---|---|---|---|---|---|---|
| 0.604 | 1.7 | 1.7 | 3 | 3 | −2.4 | 2.8 | 2.8 |
| 0.7 | 1.8 | 1.8 | 3 | 3 | −2.4 | 2.7 | 2.7 |

In an additional embodiment of the invention, the flow divider 10 is, such as already mentioned, embodied as a component of a fluid line system serving for conveying, or transferring, a flowing fluid, for example, a liquid, a gas or a dispersion, or is used in such a fluid line system. The fluid line system can, for example, be provided, or adapted, to divide arriving fluid —, for example, via a connected supply segment of a pipeline—into two flow portions and to convey these in a flow direction of the fluid line system further along two parallel flow paths. Alternatively or supplementally, the above-mentioned fluid line system can also be adapted to bring two flow portions conveyed along two parallel flow paths together to form one fluid stream and to output this, for example, to a connected drain segment of a pipeline. For such purpose, the fluid line system includes in an additional embodiment of the invention, as well as also shown in FIGS. 3a, 3b, besides the flow dividers 10, a first fluid line 100 —, for example, embodied as a rigid and/or at least sectionally circularly cylindrical tube—with a lumen 100* surrounded by a wall, for example, of a metal, and extending from a first line end 100+ of the fluid line 100 to a second line end (not shown) of the fluid line 100 as well as at least a second fluid line 200 —, for example, embodied as a rigid and/or at least sectionally circularly cylindrical tube and/or constructed equally to the fluid line 100—with a lumen 200* surrounded by a wall, for example, of a metal, and extending from a first line end 200+ to a second line end 200 #. In an additional embodiment of the invention, the wall of the fluid line 100 is composed of the same material as the wall of the fluid line 200 and/or the walls of the first and second fluid lines 100, 200 are of the same material as the wall of the flow divider 10. Alternatively or supplementally, it is, additionally, provided that the wall of the fluid line 100 and/or the wall of the fluid line 200 is composed, in each case, of a stainless steel, for example, a special steel, especially AISI (American Iron and Steel Institute) 304, AISI 304L, AISI 316L, Material Number 1.4401, Material Number 1.4404 or UNS (Unified Numbering system for Metals and Alloys) S31603, a duplex steel, a super duplex steel, especially. Material Number 1.4410 or Material Number 14501, a nickel-molybdenum-alloy, especially Hastelloy B, a nickel-molybdenum-chromium-alloy, especially Hastelloy C, or Hastelloy C-22.

As shown in FIG. 3b, or directly evident from a combination of FIGS. 3b and 3a, in the case of the above described fluid line system, both the fluid line 100 with its line end 100+ as well as also the fluid line 200 with its line end 200+ can, in each case, be connected with the flow divider end 10+ of the flow divider 10, in such a manner that the lumen 100* of the fluid line 100 communicates with the lumen 10* of the flow divider 10 to form a flow path leading through the flow divider opening 10a of the flow divider 10 and the lumen 200* of the fluid line 200 communicates with the lumen 10* of the flow divider 10 to form a flow path leading through the flow divider opening 10b of the flow divider 10.

Figure 8:
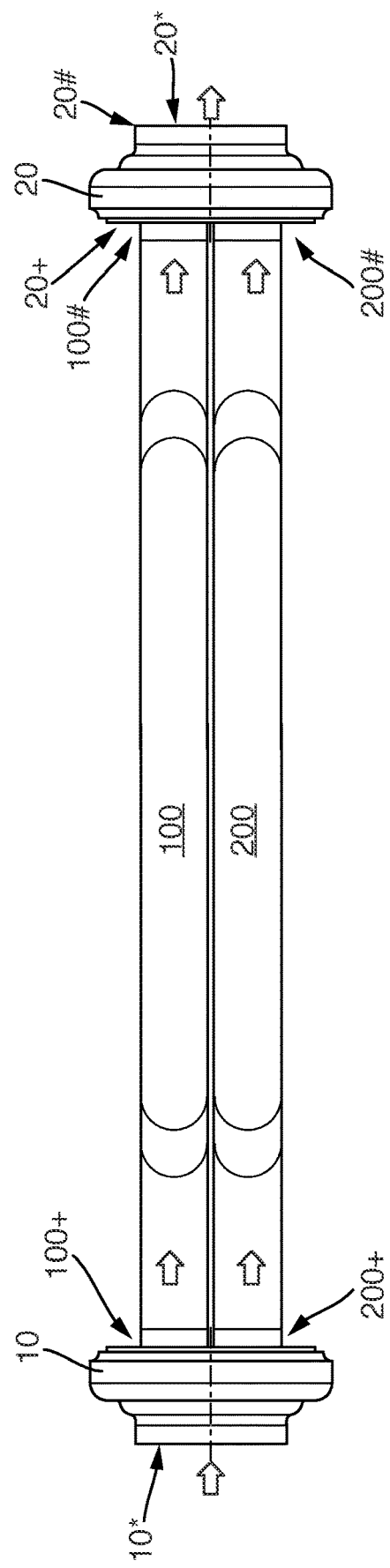
FIG. 8 shows schematically in a first side view, another example of an embodiment of a fluid line system formed by means of a flow divider of FIG. 1.
Figure 9:
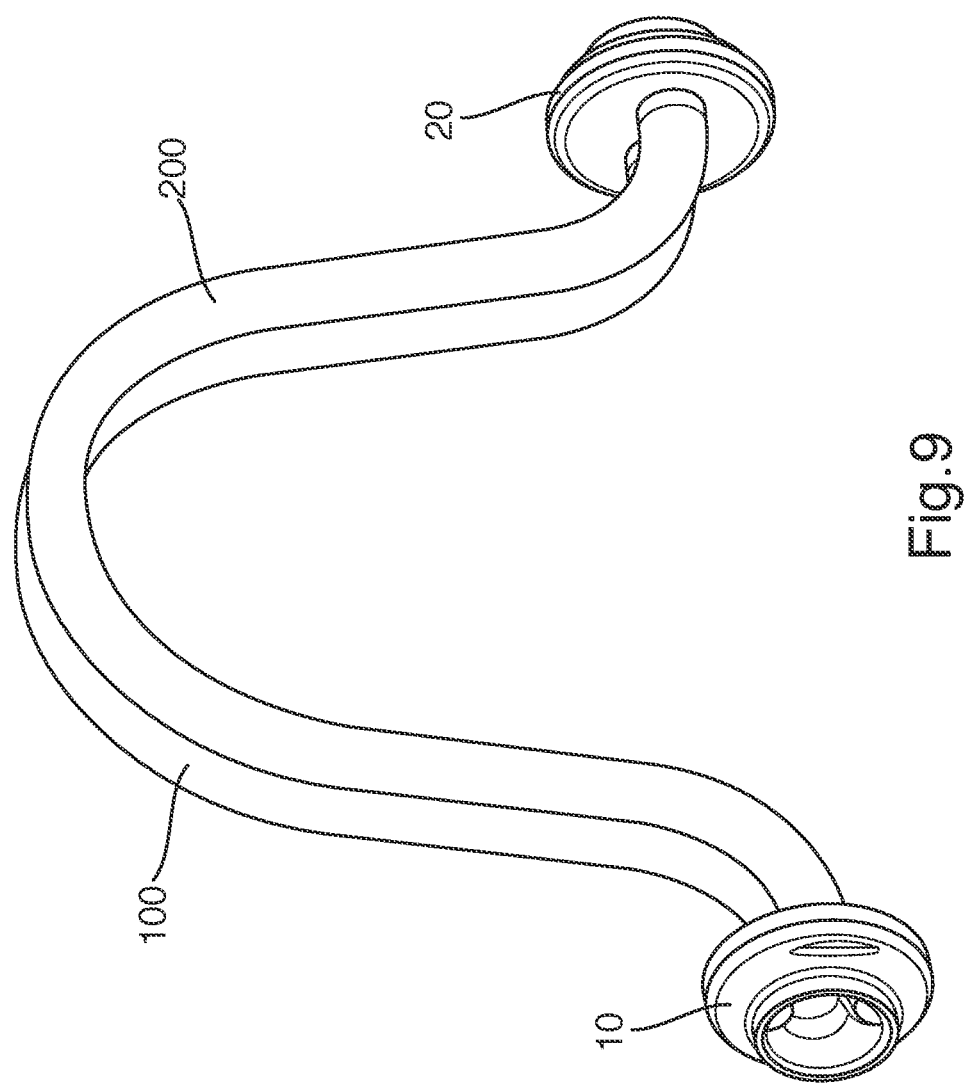
FIG. 9 shows schematically in a perspective, second side view, the fluid line system of FIG. 8.

In an additional embodiment of the invention, the above-mentioned fluid line system comprises, as well as also shown schematically in FIGS. 8 and 9, furthermore, an additional (second) flow divider 20 corresponding to the (first) flow divider 10, having a lumen 20* (namely a lumen 20* surrounded by a wall) extending both from a first flow divider opening 20a located in a first flow divider end 20+ as well as also from a second flow divider opening 20b located in the flow divider end 20+ and spaced from the flow divider opening 20a to a circularly shaped, third flow divider opening 10c located in a second flow divider end 20 #, which (second) flow divider 20 is likewise connected with the two previously indicated fluid lines 100, 200; this, especially, in such a manner that, as well as also directly evident from FIGS. 8, 9, both the fluid line 100 with its line end 100 #as well as also the fluid line 200 with its line end 200 #are connected with the first flow divider end 20+ of the flow divider 20, in such a manner that the lumen 100* of the fluid line 100 communicates with the lumen 10* of the flow divider 10 to form a first flow path leading both through the flow divider opening 10a of the flow divider 10 as well as also through a first flow divider opening of the flow divider 20 and the lumen 200* of the fluid line 200 communicates with the lumen 20* of the second flow divider 20 to form a second flow path leading both through the flow divider opening 10b of the flow divider 10 as well as also through a second flow divider opening of the flow divider 20 for flow in parallel with the first flow path. In an additional embodiment of the invention, the flow divider 20 is of construction equal to that of the flow divider 10, or identically embodied.

Figure 10:
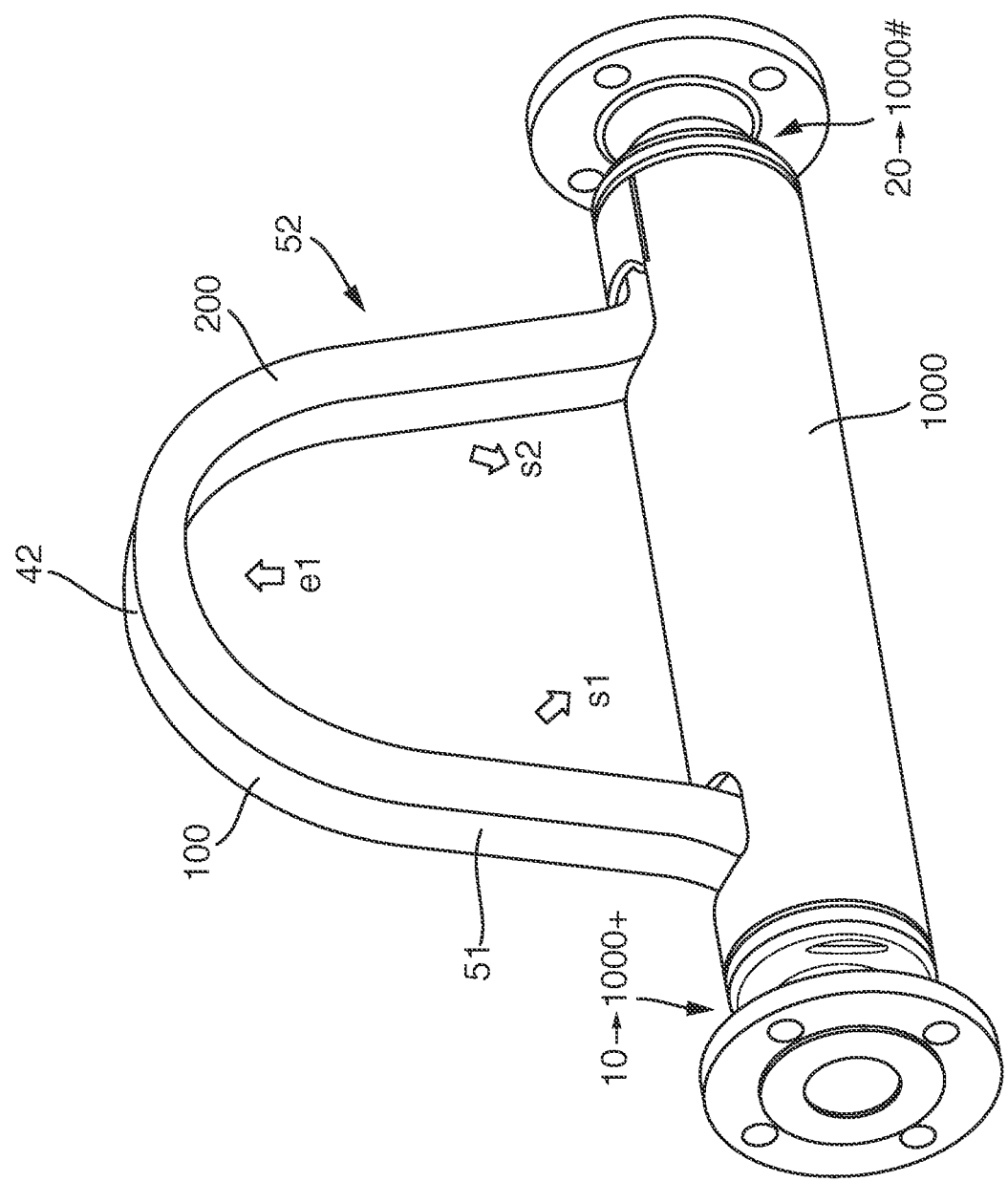
FIG. 10 shows schematic side view of a measuring transducer formed by means of the fluid line system of FIGS. 8, 9 for measuring at least one physical, measured variable of a fluid flowing in a pipeline.

For the above described case, in which the fluid line system is a component of a measuring transducer, or a measuring system formed therewith, the fluid line system includes in an additional embodiment of the invention, furthermore, a sensor arrangement, which is adapted to provide at least one, for example, electrical and/or analog, measurement signal s1 representing the at least one measured variable; this, especially, in such a manner that the measurement signal s1 has at least one signal parameter dependent on the measured variable, namely changes as a function of the measured variable. Serving as a signal parameter dependent on the measured variable is, in turn, for example, a signal level dependent on the at least one measured variable, a signal frequency dependent on the measured variable and/or a phase angle of the measurement signal dependent on the measured variable. The sensor arrangement can, such as shown in FIG. 10, be placed outside of the fluid lines 100, 200, equally as well, in their vicinity, for example, also in such a manner that the sensor arrangement is mounted on at least one of the fluid lines 100, 200. In an additional embodiment of the invention, the sensor arrangement is, furthermore, adapted to register mechanical oscillations of at least one of the two fluid lines 100, 200, for example, bending oscillations of the fluid line 100 and/or the fluid line 200 at one or more resonance frequencies of the fluid line system, and to provide at least one oscillatory signal representing oscillations of at least one of the fluid lines, and serving as a measurement signal. The sensor arrangement can have for this, for example, an electrodynamic oscillation sensor 51 and/or an oscillation sensor 51 differentially registering oscillatory movements of the two fluid lines 100, 200.

In an additional embodiment, the fluid line system includes, furthermore, an electromechanical-exciter arrangement, which is adapted to convert electrical power into mechanical power effecting mechanical oscillations of the fluid lines, for example, the above described bending oscillations of the fluid line 100 and/or the fluid line 200. The exciter arrangement can be formed, for example, by means of at least one electrodynamic oscillation exciter 41 and/or an oscillation exciter 41 acting differentially on the two fluid lines 100, 200. Particularly for the mentioned case, in which the fluid line system is provided to measure mass flow based on Coriolis forces generated in the flowing fluid, the sensor arrangement, or the fluid line system formed therewith, can, as well as also indicated in FIG. 10, have, supplementally to the oscillation sensor 51, additionally, also at least a second oscillation sensor 52 for producing at least a second oscillation measurement signal corresponding to the measured variable, —especially an electrical and/or analog measurement signal—serving as a second measurement signal s2. The oscillation sensor 52 can be of construction equal to that of the oscillation sensor 51 and/or positioned removed from the fluid line 100, or the fluid lines 100, 200 with equal separation as the oscillation sensor 51. Alternatively or supplementally, the oscillation sensors 51, 52 can be positioned symmetrically to the above described oscillation exciter 41, for example, also in such a manner that, such as shown in FIG. 10 and as quite usual in the case of vibronic measuring transducers, the oscillation sensor 52 is farther removed from the flow divider 10 than the oscillation sensor 51, or, conversely, the oscillation sensor 51 is farther removed from the flow divider 20 than the oscillation sensor 52 and/or in such a manner that the oscillation sensor 51 is equally far removed from the flow divider 10 as the oscillation sensor 52 is from the flow divider 20.

For the purpose of processing, or evaluating, the at least one measurement signal s1, or the measurement signals s1, s2, a measuring system formed by means of the above described fluid line system can, furthermore, comprise, electrically coupled with the sensor arrangement, a measuring- and operating electronics, for example, one formed by means of at least one microprocessor and/or one digital signal processor (DSP), which in advantageous manner, can, in turn, be accommodated in a protective housing 5000, which is, in sufficient measure, dust- and watertight, or impact- and explosion resistant. Especially, such a measuring- and operating electronics can, furthermore, be adapted to process the at least one measurement signal s1, or the measurement signals s1, s2, for example, to ascertain by means of the measurement signal s1 and/or of the measurement signal s2 measured values for the at least one measured variable. For the above described case, in which the fluid line system is equipped with at least one oscillation exciter 41, the measuring- and operating electronics 500 can, additionally, be electrically coupled with the oscillation exciter 41 and, additionally, adapted to supply an electrical excitation signal e1 to the above described oscillation exciter 41, and the oscillation exciter 41 can, additionally, be adapted to convert electrical power supplied by means of the excitation signal e1 into mechanical oscillations of at least the fluid line 100, or to convert electrical power supplied by means of the excitation signal e1 into mechanical power effecting mechanical oscillations of both the fluid line 100 as well as also the fluid line 200.

As indicated in FIG. 10, the fluid line system can, particularly also in the case of its use in a measuring system, comprise, furthermore, a protective housing 1000 for the fluid lines 100, 200. The protective housing 1000 shown in FIG. 10 has a cavity surrounded by a wall and within which the fluid line 100 and at least the fluid line 200 are placed. Particularly for the purpose of forming a sufficiently torsion- and bending-resistant, impact- and pressure resistant, protective housing, its wall can be made, for example, of a metal, for instance, a stainless steel, and/or, such as quite usual and shown in FIG. 10, be embodied at least partially hollow cylindrically. As, furthermore, shown in FIG. 10, additionally, a first housing end 1000+ of the protective housing 1000 can be formed by means of the flow divider 10, for instance, in such a manner that the flow divider 10 is an integral component of the protective housing and/or that the protective housing 1000 has a side wall laterally bounding the above-mentioned opening, which is fixed laterally on the flow divider 10, or connected to such by material bonding. Moreover, additionally, also a second housing end 1000 # of the protective housing 1000 can be formed by means of the flow divider 20, for example, also such that both the flow divider 10 as well as also the flow divider 20 are, in each case, integral components of the protective housing, or that the protective housing 1000 has a side wall laterally bounding the opening and laterally secured both to the flow divider 10 as well as also to the flow divider 20, or connected with the first fluid line by material bonding.

The invention claimed is:

1. A flow divider for connecting fluid lines serving for conveying a flowing fluid, comprising:
   a lumen surrounded by a wall and extending from a first flow divider opening located in a first flow divider end and a second flow divider opening, located spaced in the first flow divider end from the first flow divider opening, to a third flow divider opening located in a second flow divider end;
   wherein the lumen has a principal axis of inertia aligning the first and second flow divider ends, as well and a first symmetry plane and a second symmetry plane perpendicular thereto, and the first and second symmetry planes intersect one another in the principal axis of inertia;
   wherein the lumen has planar cross sectional areas, which are perpendicular to the principal axis of inertia and which have, in each case, a geometric center of gravity located in the first symmetry plane;
   wherein a first cross sectional area located in the first flow divider end has its geometric center of gravity removed from the principal axis of inertia of the lumen corresponds to the first flow divider opening of the flow divider;
   wherein a second cross sectional area is located in the first flow divider end and has its geometric center of gravity removed both from the principal axis of inertia of the lumen and also from the geometric center of gravity of the first cross sectional area corresponds to the second flow divider opening of the flow divider;
   wherein a third cross sectional area is located in the second flow divider end and has its geometric center of gravity lying on the principal axis of inertia of the lumen corresponds to the third flow divider opening of the flow divider;

wherein each of the cross sectional areas of the lumen has a separation $z_i$ from the third cross sectional area, measured as a separation between a projection of the geometric center of gravity of such cross sectional area onto the principal axis of inertia and the geometric center of gravity of the third cross sectional area;

wherein each of the cross sectional areas of the lumen has radii extending from a geometric center of gravity to the wall and, in each case, lying at an angle $\varphi(-180° \leq \varphi \leq 180°)$ to a reference axis, namely an imaginary axis lying both in the cross sectional area as well as also in the first symmetry plane of the lumen and, additionally, being perpendicular to its principal axis of inertia;

wherein each radius lying at an angle $\varphi=0°$ to the relevant reference axis points away from the second symmetry plane;

wherein each radius$_i$ of each cross sectional area fulfills, in each case, a formula associated with its cross sectional area and defined by a coefficients set $P_i(P_i=[a_i\ b_i\ m_{1i}\ m_{2i}\ n_{1i}\ n_{2i}\ n_{3i}])$ containing, in each case, seven coefficients: a first coefficient of expansion $a_i$, a second coefficient of expansion $b_i$, a first symmetry coefficient $m_{1i}$, a second symmetry coefficient $m_{2i}$, a first form coefficient $n_{1i}$, a second form coefficient $n_{2i}$ and a third form coefficients $n_{3i}$; and wherein the coefficients are scaled to a greatest radius $R_0$ of the third cross sectional area, namely:

$$R_i(\varphi) = R_0 \cdot r_i(\varphi) = f_i(\varphi, P_i) = f_i(\varphi, [a_i\ b_i\ m_{1i}\ m_{2i}\ n_{1i}\ n_{2i}\ n_{3i}])$$
$$= R_0 \cdot \sqrt[-n_{1i}]{\left|\frac{1}{a_i}\cos\left(\frac{m_{1i}}{4}\varphi\right)\right|^{n_{2i}} + \left|\frac{1}{b_i}\sin\left(\frac{m_{2i}}{4}\varphi\right)\right|^{n_{3i}}},$$

such that:

the radii $R_1(\varphi)$ of the first cross sectional area of the lumen fulfill a first formula $f_1(\varphi, P_1)$ defined by a first coefficients set $P_1=[a_1\ b_1\ m_{11}\ m_{21}\ n_{11}\ n_{21}\ n_{31}]$ with $a_1=(0.4 \ldots 0.5)$, $b_1=(0.4 \ldots 0.5)$, the radii $R_2(\varphi)$ of the second cross sectional area of the lumen fulfill a second formula $f_2(\varphi, P_2)$ defined by a second coefficients set $P_2=[a_2\ b_2\ m_{12}\ m_{22}\ n_{12}\ n_{22}\ n_{32}]$ with $a_2=a_1$, $b_2=b_1$, $m_{12}=m_{11}$, $m_{22}=m_{21}$, $n_{12}=n_{11}$, $n_{22}=n_{21}$ and $n_{32}=n_{31}$, the radii $R_3(\varphi)$ of the third cross sectional area of the lumen fulfill a third formula $f_3(\varphi, P_3)$ defined by a third coefficients set $P_3=[a_3\ b_3\ m_{13}\ m_{23}\ n_{13}\ n_{23}\ n_{33}]$ with $a_3=1$, $b_3=a_3$, $m_{13}=4$, $m_{23}=m_{13}$, $n_{13}=2.0$, $n_{23}=n_{13}$ and $n_{33}=n_{13}$, and the radii $R_4(\varphi)$ of a fourth cross sectional area of the lumen lying with its geometric center of gravity on the principal axis of inertia of the lumen and located at a separation $z_4$ from the third cross sectional area, which amounts to greater than 20% of the separation $z_1(z_4>0.2\cdot z_1)$ and less than 45% of the separation $z_1(z_4<0.45\cdot z_1)$ fulfill a fourth formula $f_4(\varphi, P_4)$ defined by a fourth coefficients set $P_4=[a_4\ b_4\ m_{14}\ m_{24}\ n_{14}\ n_{24}\ n_{34}]$ with $a_4=(0.95 \ldots 1)$, $b_4=(0.45 \ldots 0.7)$, $m_{14}=4$, $m_{24}=4$, $n_{14}=3.0$, $n_{24}=n_{14}$ and $n_{34}=(3 \ldots 4)$.

2. The flow divider as claimed in claim 1, wherein the radii $R_5(\varphi)$ of a fifth cross sectional area of the lumen lying with its geometric center of gravity on the principal axis of inertia (z) of the lumen and located at a separation $z_5$ from the third cross sectional area, which amounts to not less than 10% of the separation $z_1(z_5>0.1\cdot z_1)$ and no greater than 20% of the separation $z_1(z_5 \leq 0.2\cdot z_1)$, fulfill a fifth formula $f_5(\varphi, P_5)$ defined by a fifth coefficients set $P_5=[a_5\ b_5\ m_{15}\ m_{25}\ n_{15}\ n_{25}\ n_{35}]$ with $a_5=(0.97 \ldots 1)$, $b_5=(0.65 \ldots 1)$, $m_{15}=4$, $m_{25}=4$, $n_{15}=3$, $n_{25}=3$ and $n_{35}=(2 \ldots 3.5)$.

3. The flow divider as claimed in claim 2, wherein the fifth cross sectional area is so embodied that its second expansion coefficient $b_5$ fulfills, as a function of its separation $z_5$, scaled to the separation $z_1$ of the first cross sectional area, a formula:

$$b_5 = \left(47.2 \ldots 47.8\right)\left(\frac{z_5}{z_1}\right)^2 - (17.5 \ldots 17.18)\left(\frac{z_5}{z_1}\right) + (2.2 \ldots 2.4);$$

or wherein the fifth cross sectional area $(xy_5)$ is so embodied that its third form coefficient $n_{35}$, as a function of its separation $z_5$, scaled to the separation $z_1$ of the first cross sectional area $(xy_1)$, fulfills a formula:

$$n_{35} = (2.4 \ldots 2.6)\cdot\left(\frac{z_5}{z_1}\right) + (7.7 \ldots 8),$$

especially $$n_{35} = 2.55\cdot\left(\frac{z_5}{z_1}\right) + 7.87;$$

or wherein the fifth cross sectional area is so embodied that a ratio $n_{35}/b_5$ of its third form coefficients $n_{35}$ to its second coefficient of expansion $b_5$ amounts to greater than 2 and/or less than 6.

4. The flow divider as claimed in claim 1, wherein for none of the cross sectional areas of the lumen is the third form coefficient $n_{3i}$ greater than the third form coefficient $n_{34}$ of the fourth cross sectional area; and/or wherein the fourth cross sectional area is so embodied that a ratio $n_{34}/b_4$ of its third form coefficient $n_{34}$ to its second coefficient of expansion $b_4$ amounts to not less than 5.5 and/or no greater than 7.

5. The flow divider as claimed in claim 1, wherein the radii $R_6(\varphi)$ of a sixth cross sectional area of the lumen lying with its geometric center of gravity on the principal axis of inertia of the lumen and located at a separation $z_6$ from the third cross sectional area, which amounts to greater than 45% of the separation $z_1(z_6>0.45\cdot z_1)$ and less than 60% of the separation $z_1(z_6<0.6\cdot z_1)$ fulfills a sixth formula $f_6(\varphi, P_6)$ defined by a sixth coefficients set $P_6=[a_6\ b_6\ m_{16}\ m_{26}\ n_{16}\ n_{26}\ n_{36}]$ with $a_6=(0.98 \ldots 1)$, $b_6=(0.7 \ldots 0.8)$, $m_{16}=4$, $m_{26}=4$, $n_{16}=1$, $n_{26}=(2 \ldots 2.5)$ and $n_{36}=(2.1 \ldots 2.8)$.

6. The flow divider as claimed in claim 5, wherein the sixth cross sectional area is so embodied that its third form coefficient $n_{36}$, as a function of its separation $z_6$, scaled to the separation $z_1$ of the first cross sectional area $(xy_1)$, fulfills a formula:

$$n_{36} = (3.4 \ldots 3.6)\cdot\left(\frac{z_6}{z_1}\right) + (0.5 \ldots 0.7),$$

especially $$n_{36} = 3.57 \cdot \left(\frac{z_6}{z_1}\right) + 0.64.$$

7. The flow divider as claimed in claim 1, wherein the radii $R_7(\varphi)$ of a seventh cross sectional area of the lumen lying with its geometric center of gravity removed from the principal axis of inertia (z) of the lumen and located at a separation $z_7$ from the third cross sectional area, which amounts to greater than 70% of the separation $z_1(z_7>0.7\cdot z_1)$ and less than 95% of the separation $z_1(z_7<0.95\cdot z_1)$, fulfill a seventh formula $f_7(\varphi, P_7)$ defined by a seventh coefficients set $P_7=[a_7\ b_7\ m_{17}\ m_{27}\ n_{17}\ n_{27}\ n_{37}]$ with $a_7=(0.40\ \ldots\ 0.55)$, $b_7=a_7$, $m_{17}=(3\ \ldots\ 4)$ $m_{27}=(3\ \ldots\ 4$ $n_{17}=(2.7\ \ldots\ 2.8)$ $n_{27}=(2.3\ \ldots\ 2.5)$ and $n_{37}=n_{27}$, and wherein the radii $R_8(\varphi)$ of an eighth cross sectional area of the lumen lying with its geometric center of gravity removed from the principal axis of inertia of the lumen and located at a separation $z_8$ from the third cross sectional area, which equals the separation of the seventh cross sectional area, fulfill an eighth formula $f_8(\varphi, P_8)$ defined by an eighth coefficients set $P_8=[as\ b_8$ $m_{18}\ m_{28}\ n_{18}\ n_{28}\ n_{38}]$ with $a_8=a_7$, $b_8=b_7$, $m_{18}=m_{17}$, $m_{28}=m_{27}$, $n_{18}=n_{17}$, $n_{28}=n_{27}$ and $n_{38}=n_{37}$.

8. The flow divider as claimed in claim 7, wherein the geometric center of gravity of the seventh cross sectional area of the lumen has a separation from the second symmetry plane and the geometric center of gravity of the eighth cross sectional area of the lumen has a separation $x_8$ from the second symmetry plane, and wherein a magnitude of each of the separations $x_7$, $x_8$ the seventh and eighth cross sectional area scaled to the radius) $R_7(0°$, respectively) $R_8$ ($0°$ of the seventh, and eighth cross sectional areas, in each case, at least equals the respective first coefficients of expansion $a_7$, $a_8$ the seventh, and eighth cross sectional areas and/or, in each case, corresponds at most to 1.2-times the respective first coefficients of expansion $a_7$, $a_8$.

9. The flow divider of claim 1, wherein for each of the cross sectional areas of the lumen the first expansion coefficient $a_i$ amounts to not less than 0.9 and/or no greater than 1; and/or wherein for each of the cross sectional areas of the lumen the second expansion coefficient $b_i$ amounts to not less than 0.4 and/or no greater than 1; and/or wherein for each of the cross sectional areas of the lumen the first form coefficient $n_{1i}$ amounts to not less than 2 and/or no greater than 3; and/or wherein for each of the cross sectional areas of the lumen the second form coefficient $n_{2i}$ amounts to not less than 2 and/or no greater than 3.

10. The flow divider as claimed in claim 1, wherein the geometric center of gravity of the first cross sectional area of the lumen has a separation $x_1$ from the second symmetry plane and the geometric center of gravity of the second cross sectional area of the lumen has a separation $x_2$ from the second symmetry plane, and wherein a magnitude of each of the separations $x_1$, $x_2$ of the first and second cross sectional areas, scaled to the radius) $R_1(0°$, respectively) $R_2(0°$ of the first, and second, cross sectional areas corresponds, in each case, to at least 1.05-times, especially at least 1.2-times, the first coefficient of expansion $a_1$, $a_2$ of the first, and second, cross sectional areas, and/or, in each case, at most 1.5-times, especially at most 1.3-times, the respective first coefficient of expansion $a_1$, $a_2$ of the first, and second, cross sectional areas.

11. The flow divider as claimed in claim 1, wherein none of the first coefficients of expansion $a_i$ of one of the coefficients sets $P_i$ is greater than the first expansion coefficient $a_1$ of the first coefficients set $P_1$; and/or wherein none of the second coefficients of expansion $b_1$ of one of the coefficients sets $P_i$ is greater than the second expansion coefficient $b_1$ of the first coefficients set $P_1$.

12. The flow divider as claimed in claim 1, wherein no cross sectional area has an area, which is greater than an area of the third cross sectional area; and/or wherein no cross sectional area has an area, which is less than an area of the first cross sectional area or the second cross sectional area; and/or wherein a ratio of an area of the third cross sectional area to an area of the first cross sectional area or the second cross sectional area is, in each case, greater than 1 and/or less than 1.5.

13. The flow divider as claimed in claim 1, wherein the separation $z_1$ of the first cross sectional area from the third cross sectional area equals the separation $z_2(z_2=z_1)$ of the second cross sectional area from the third cross sectional area; and/or wherein the separation $z_1$ of the first cross sectional area from the third cross sectional area and/or the separation $z_2(z_2=z_1)$ of the second cross sectional area from the third cross sectional area corresponds to a length L of the lumen.

14. The flow divider as claimed in claim 1, wherein the first flow divider opening is adapted to be connected by material bonding with a hollow cylindrical, end section of a first fluid line, in such a manner that a lumen of the first fluid line communicates with the lumen of the flow divider to form a first flow path leading through the first flow divider opening;

wherein the second flow divider opening is adapted to be connected by material bonding with a hollow cylindrical, end section of a second fluid line, in such a manner that a lumen of the second fluid line communicates with the lumen of the flow divider to form a second flow path leading through the second flow divider opening for flow in parallel with the first flow path.

15. The flow divider as claimed in claim 1, wherein the wall of the flow divider is composed of a stainless steel, a special steel, a duplex steel or a super duplex steel.

16. The flow divider as claimed in claim 1, wherein the wall of the flow divider is composed of a nickel-molybdenum-alloy, especially a nickel-molybdenum-chromium-alloy.

17. A fluid line system, comprising:

at least a first flow divider corresponding to a flow divider as claimed in claim 1;

a first fluid line having a lumen surrounded by a wall, wherein the lumen extends from a first line end of the first fluid line to a second line end of the first fluid line;

at least a second fluid line, wherein the second fluid line has a lumen surrounded by a wall, wherein the lumen extends from a first line end of the second fluid line to a second line end of the second fluid line;

wherein both the first fluid line with its first line end as well as also the second fluid line with its first line end are, in each case, connected with the first flow divider end of the first flow divider, in such a manner that the lumen of the first fluid line communicates with the lumen of the first flow divider to form a first flow path leading through the first flow divider opening of the first flow divider and the lumen of the second fluid line communicates with the lumen of the first flow divider to form a second flow path leading through the second flow divider opening of the first flow divider.

18. The fluid line system as claimed in claim 17, further comprising:
    a second flow divider;
    wherein both the first fluid line with its second line end as well as also the fluid line with its second line end are, in each case, connected with the first flow divider end of the second flow divider, in such a manner that the lumen of the first fluid line communicates with the lumen of the first flow divider as well as also with the lumen of the second flow divider to form a first flow path leading both through the first flow divider opening of the first flow divider as well as also through the first flow divider opening of the second flow divider and the lumen of the second fluid line communicates with the lumen of the first flow divider as well as also with the lumen of the second flow divider to form a second flow path leading both through the second flow divider opening of the first flow divider as well as also through the second flow divider opening of the second flow divider, and connected for flow in parallel with the first flow path.

19. The fluid line system as claimed in claim 17, further comprising
    an electro-mechanical exciter arrangement, which is adapted to convert electrical power to mechanical power effecting mechanical oscillations of the first and second fluid lines; and/or
    a sensor arrangement, which is adapted to register mechanical oscillations of the first and second fluid lines and to provide at least one oscillatory signal representing oscillations of at least one of the first and second fluid lines.

20. The fluid line system as claimed in claim 17,
    wherein the wall of the first fluid line is composed of a stainless steel, a duplex steel or a super duplex steel; and/or
    wherein the wall of the second fluid line is composed of a stainless steel, a duplex steel or a super duplex steel; and/or
    wherein the wall of the first fluid line is composed of a nickel-molybdenum-alloy; and/or
    wherein the wall of the first fluid line is composed of a nickel-molybdenum-alloy.

* * * * *